(12) United States Patent
Guagliumi et al.

(10) Patent No.: US 10,204,248 B2
(45) Date of Patent: Feb. 12, 2019

(54) LINEAR OPTICAL INFORMATION READER OF THE IMAGER TYPE AND METHOD FOR ALIGNING AN OPTICAL INFORMATION READER OF THE IMAGER TYPE

(71) Applicant: DATALOGIC IP TECH, S.R.L., Bologna (IT)

(72) Inventors: Anna Guagliumi, Bologna (IT); Federico Canini, Bologna (IT); Davide Bottazzi, Bologna (IT); Kurt Vonmetz, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 15/309,402

(22) PCT Filed: May 8, 2015

(86) PCT No.: PCT/EP2015/060258
§ 371 (c)(1),
(2) Date: Nov. 7, 2016

(87) PCT Pub. No.: WO2015/169963
PCT Pub. Date: Nov. 12, 2015

(65) Prior Publication Data
US 2017/0076123 A1  Mar. 16, 2017

(30) Foreign Application Priority Data

May 8, 2014  (IT) .............................. MI2014A0837

(51) Int. Cl.
*G06K 7/10* (2006.01)
*G02B 19/00* (2006.01)
(Continued)

(52) U.S. Cl.
CPC ..... *G06K 7/10722* (2013.01); *G02B 19/0066* (2013.01); *G02B 27/0911* (2013.01);
(Continued)

(58) Field of Classification Search
USPC .......................... 362/551, 558; 235/470, 454
See application file for complete search history.

(56) References Cited

U.S. PATENT DOCUMENTS

| | | |
|---|---|---|
| 2002/0066851 A1 | 6/2002 | Hennick et al. |
| 2003/0089779 A1 | 5/2003 | Giordano et al. |

(Continued)

OTHER PUBLICATIONS

International Search Report and Written Opinion, dated Oct. 7, 2015, for PCT/EP2015/060258, 21 pages.

*Primary Examiner* — Jamara Franklin
(74) *Attorney, Agent, or Firm* — Cozen O'Connor

(57) ABSTRACT

The present invention relates to an active alignment method of a receiving device (2, 2') including a sensor (4) and of a illumination device (6, 6') including at least one light source (18, 8') suitable for emitting a beam of light, including: —Assembling said receiving device (2, 2'); —Stably fixing said receiving device (2, 2') on a chassis (30); —Actively aligning an optical group (11, 11') of said illumination device (6, 6') with respect to said light source (18, 18'); —Fixedly connecting said optical group (11, 11') of said illumination device to said light source (18, 18'); —Actively aligning said illumination device (6, 6') with respect to said receiving device (2, 2'); and —Stably fixing said illumination device (6, 6') to said chassis (30).

36 Claims, 13 Drawing Sheets

(51) Int. Cl.
*G02B 27/09* (2006.01)
*G02B 27/62* (2006.01)

(52) U.S. Cl.
CPC ..... *G02B 27/0916* (2013.01); *G02B 27/0922* (2013.01); *G02B 27/0927* (2013.01); *G02B 27/0955* (2013.01); *G02B 27/62* (2013.01)

(56) References Cited

U.S. PATENT DOCUMENTS

| | | |
|---|---|---|
| 2005/0046844 A1 | 3/2005 | Hu |
| 2007/0215703 A1 | 9/2007 | Aoki et al. |
| 2009/0059616 A1* | 3/2009 | Wittenberg ............ G02B 5/021 362/558 |
| 2010/0067848 A1 | 3/2010 | Hwang et al. |
| 2010/0213258 A1 | 8/2010 | Liu et al. |
| 2011/0297853 A1 | 12/2011 | Liu et al. |
| 2012/0084049 A1 | 4/2012 | Wooi Quan et al. |

* cited by examiner

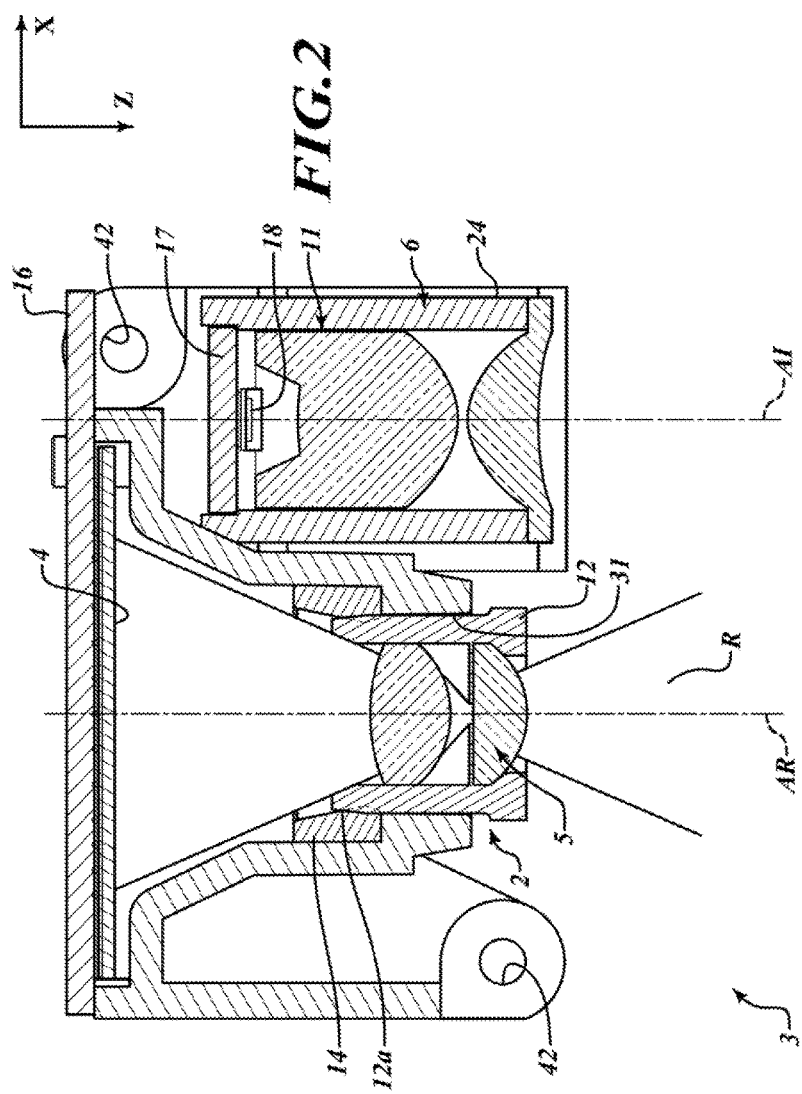

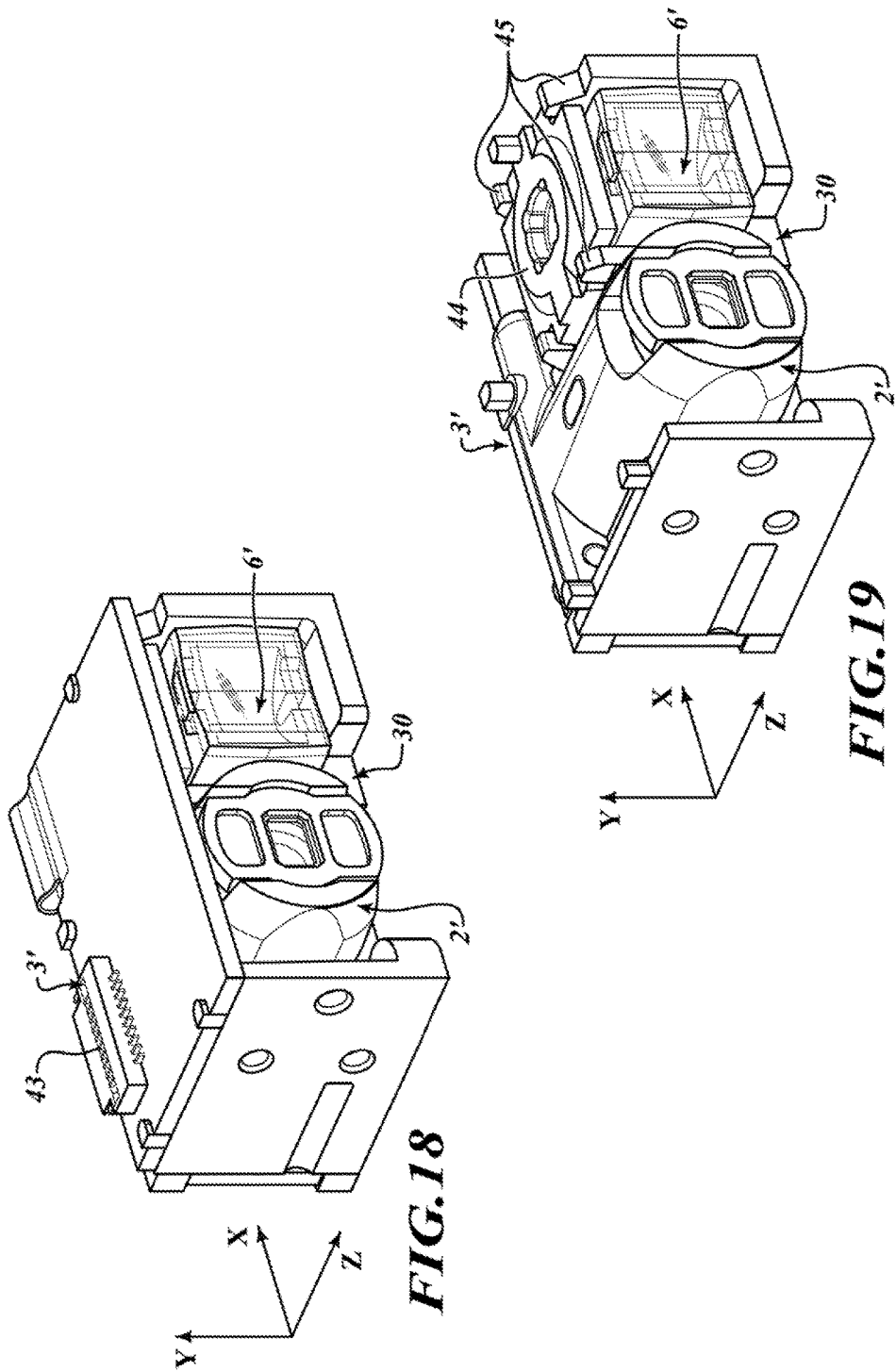

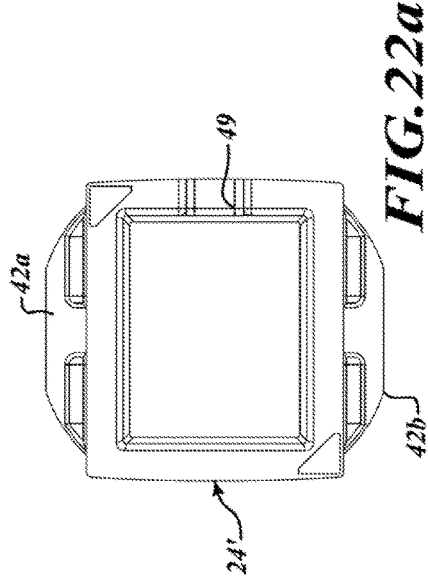
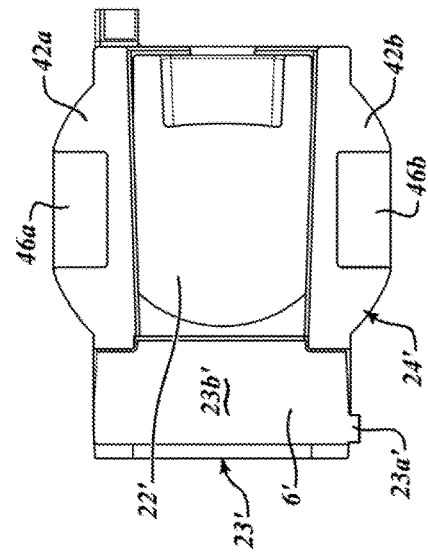
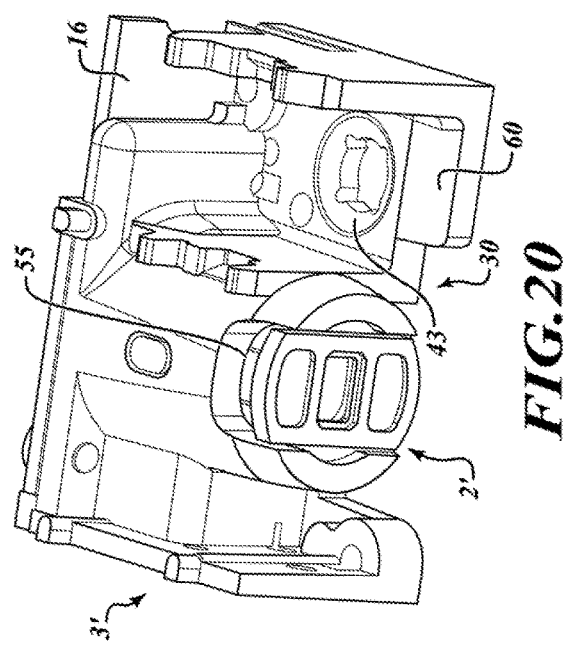

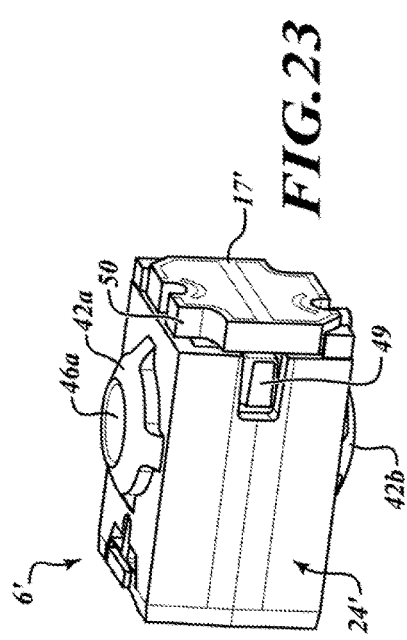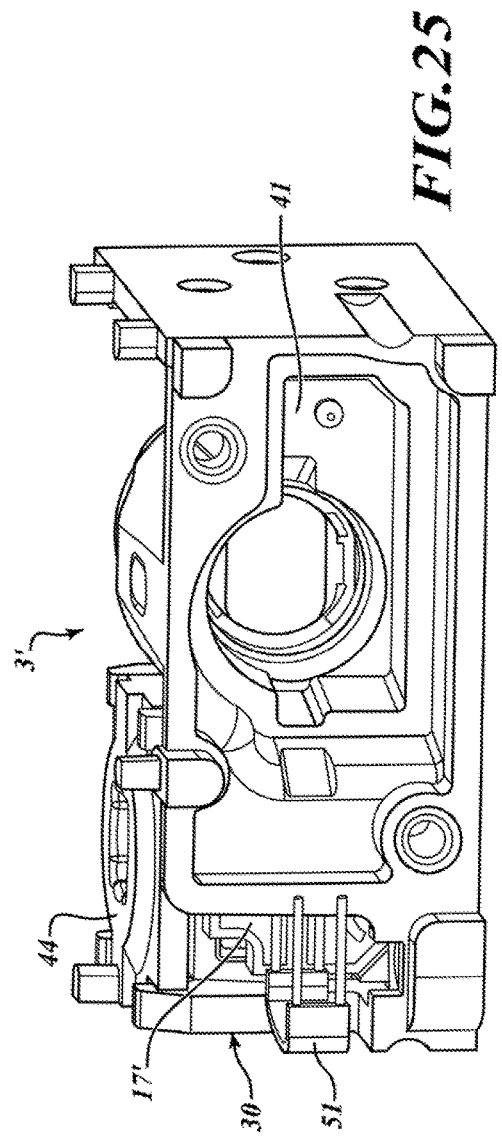

LINEAR OPTICAL INFORMATION READER OF THE IMAGER TYPE AND METHOD FOR ALIGNING AN OPTICAL INFORMATION READER OF THE IMAGER TYPE

TECHNICAL FIELD

The present invention relates to a linear optical information reader of the image formation type (commonly referred to in English as the "imager" type), as well as a method for aligning some components of the optical information reader of the imager type.

TECHNOLOGY BACKGROUND

Optical information readers of the image formation type are well known. Said readers comprise an image capture device capable of capturing or acquiring an image of the optical information present on a substrate of any kind, herewith including a display for viewing the optical information by means of an electric or electronic device of any sort.

In the present description and enclosed claims, the expression "optical information" is utilized in a broad sense to cover both one-dimensional and stacked or two-dimensional optical codes, where the information is coded in the shapes, dimensions, colors, and/or respective positions of elements of at least two distinct colors, whether alphanumeric characters, signatures, logos, seals, brands, labels hand-written text, and images in general, both their combinations (in particular when present on preprinted modules) and images containing the characteristics suitable for identifying and/or selecting an object on the basis of its shape and/or volume.

An optical information reader is called linear or matrix according to the type of sensor utilized for creating the image. In readers known in the art, the sensor includes an array of photo-sensitive elements, which may be arranged in linear or matrix fashion, thereby giving the actual name of the reader, linear or matrix.

The optical information that can be read by a linear reader is that which is locally invariant in a direction perpendicular to the direction in which the information is coded, which is also called the scanning direction or "optical code direction". Examples of said optical information are the one-dimensional barcodes and postal codes, as well as stacked codes, where the code is locally invariant or intermittently invariant in the direction perpendicular to the direction of the optical code.

In the present description and in the enclosed claims, the term "light" is utilized in a broad sense to indicate electro-magnetic radiation of a particular wavelength or range of wavelengths, not only in the visible range but also in the ultraviolet and infrared range. The terms "color", "optical", "image", and "view" are utilized in the same broad sense. In particular, the coded information may be printed on a substrate with invisible inks which are however sensitive in the ultraviolet or infrared range.

In general, a reader of optical information, such as an optical code, comprises a source of light on one side and an optical illumination path that develops from the light source towards the optical code, and on the other side a photo-sensitive device or sensor and an optical receiver device that forms the image on the other, arranged in an optical receiving path that develops from the optical code to the sensor. The entire apparatus is placed inside a suitable housing, which is provided with at least one window for projecting the optical illumination path, that is to say the light that illuminates the optical code from the light source, and an additional window for the optical receiving path, that is the light that returns towards the sensor from the illuminated optical code. The two windows generally coincide, that is they are the same window.

The optical receiving device typically comprises an objective, including one or more lenses, for the collection and formation of the optical information image on the sensor.

The optical receiving device is characterized by an optical receiving axis, which is defined by the centers of the elements of the receiving optics, or the centers of curvature of the optical surfaces in the case of a single lens, and defines its main working direction. The receiving device is further characterized by a working space region, generally shaped as the body of a pyramid, extending in front of the sensor. The working space region, that is to say the region of space where the optical information is correctly framed by the sensor and the image of which is sufficiently focused on the sensor, is only characterized by the field of view, which expresses the angular amplitude of the working region around the receiving axis, and the depth of field, which expresses the dimension along the receiving axis. The depth of field therefore expresses the interval between the minimum and maximum useful distances along the receiving axis between the reader and the region on the substrate framed by the sensor. The field of view may also be expressed in terms of a "vertical" and a "horizontal" field of view, that is to say in terms of the angular amplitudes of two planes going through the receiving axis and perpendicular to each other, in order to duly take into account the shape factor of the sensor, or further, in the case of a receiving system without symmetry, by four angular amplitudes in half-planes 90° from each other.

In the case of a linear type sensor, as is the case in linear readers, this working space region subtends an angular amplitude in one direction which is much greater than in the other direction, and substantially forms a receiving "sliver".

The concept of a working plane may also be introduced, which is defined as the plane that contains the optical receiving axis and the direction of greater extension of the working space. In other words, this working plane is a plane that slices the center of the body of the pyramid that is usually defined by the working space in the longitudinal direction (that is to say from one base to the other).

The working space region—and therefore the field of view and depth of field—may be fixed or be made dynamically variable in the dimensions and/or its proportions by means of well known zoom and/or autofocus systems, such as electro-mechanical, piezoelectric, or electro-optic actuators for moving one or more lenses or diaphragms, mirrors, or other components in the receiving optics or sensor movement, and/or modifying the curvature of one or more lenses in the receiving optics, such as liquid or deformable lenses.

In general, the field of view and distance of the focus as well as the depth of field are determined by the design of the objective of the optics belonging to the receiving device.

The illumination device is suitable for projecting a beam of light towards the substrate bearing the optical information.

The beam of light emitted by the illumination device defines an optical axis of illumination, which is the average direction of said beam of light, defining in the process an axis of symmetry in at least one plane.

For the correct operation of the image capture device, the illumination device must be capable of illuminating the entire working space region of the receiving device, as better described hereinafter.

The light sources utilized in optical readers are chosen from the group that includes LEDs, microLEDs, and lasers.

In a linear acquisition system based on a linear sensor, the light emitted by the illumination device must be concentrated in a "strip" superimposed on the field of view of the linear sensor. In other words, each photo-sensitive element belonging to the sensor must be reached by a more or less high amount of light.

In the following description and claims, the terms "strip", sliver, or line of light will be utilized interchangeably to indicate a beam of light emitted from the illumination device, the cross-section of which along a plane perpendicular to the direction of propagation has a component in a first direction much greater than the dimension of a component in a second direction, which is substantially perpendicular to the first. These different dimensions in the cross-section of the emitted light beam are called hereinafter the minor and major dimensions.

Historically, the first linear readers of optical information that appeared on the market were based on laser scanning systems. This type of reader is characterized by a very thin and well defined line of light throughout the entire working range (within the depth of field). Subsequently, linear readers provided with a LED illumination device were implemented in order to create the image. LED illumination devices have a greater divergence in the beam of light than lasers, and in particular they create a much wider beam of emitted light, and this, for example, limits the capability to read vertically stacked optical codes at a much closer distance.

If it is necessary to reduce the dimensions of the linear reader system for ergonomic reasons, additional complications are introduced. It is known from the laws of classical optics that when a reduced volume is available for implementing the illumination and receiving optics, obtaining a line of illumination having a thickness and divergence comparable to that achieved by means of laser scanning systems is even more difficult to implement.

Linear imager systems based on laser illumination have been proposed where the beam of a laser diode is projected by means of suitable (typically cylindrical) optics, which generate a very sharp line of illumination. However, said systems need a high degree of precision in the alignment so that the fields of view of the sensor and the illumination beam of the laser light are superimposed for a significant range of distances in front of the sensor because it is desirable to have a great reading depth; furthermore, the laser light produces a very noisy signal as a result of the intrinsic speckle noise arising from the coherence of the source.

SUMMARY OF THE INVENTION

The main object of the invention is to create a linear reader of optical information of the imager type that projects a line of light that is comparable in dimensions and definition to that produced by laser illumination, but without the aforementioned speckle noise problems.

Furthermore, it is desirable that said linear reader be particularly compact.

It is necessary for this purpose to find light sources chosen from non-coherent sources in order to eliminate the speckle issues, the emission area of which is compatible with the creation of a reader that has the desired reduced dimensions.

However, when dealing with non-coherent light sources, the problems of correct alignment between the line of light and the field of view of the sensor remain similar to those present in the laser, so that it is necessary to balance the requirement of the thin line of light with an opto-mechanical system that allows a suitable alignment. Obtaining a high degree of alignment is not an easy task because the positioning tolerances characteristic of non-coherent sources are inherited by the production processes developed for applications where the required precision is at least one order of magnitude less than necessary for the present application.

Even though on one hand it is quite desirable to obtain a very thin line of light emitted from the source (as previously mentioned), also in order to maximize the intensity of the signal received by the sensor, the thinner the line of light, the more complex the sensor and the source of light; in fact even a small misalignment can cause the line of light, or at least its peak of intensity, to leave the field of view of the sensor, reducing the efficiency of the sensor and wasting most of the emitted light.

Therefore, in a first and forth aspect, the invention relates to a linear reader of the imager type having a compact volume and including an optical architecture by means of which it is possible to obtain a thin line and which simplifies the alignment problems described above.

The following reader according to the invention has been configured to emit a "strip" or line of light that has a maximum thickness "av" of less than 15 mm, and preferably less than 6 mm, at a distance "d" of half a meter from the output of the optics of the illumination device. The thickness of the strip of light is calculated as its width at half amplitude (FWHM—Full Width at Half Maximum) of the emitted beam, cross-sectioning the beam in a plane substantially perpendicular to the direction of propagation of the beam of light itself. The second direction defined by the strip of light beam in a cross-section perpendicular to its thickness preferably has a dimension much greater than its thickness "av".

In a second and third aspect, the invention relates to a method for obtaining the correct alignment of the various components of the linear reader in order to obtain the required assembly tolerances.

In said first aspect, the invention relates to a linear reader of optical information of the imager type, said reader including:
  a receiving device that includes a linear sensor and an optical group that defines an optical receiving axis and a field of view, said field of view having a cross-section with a major dimension and a minor dimension;
  an illumination device that includes at least one source of non-coherent light and an optical group that defines an optical illumination axis and is suitable for emitting a beam of light;
  characterized in that
  said optical receiving axis and said optical illumination axis are substantially coplanar;
  said optical group of said illumination device comprises, arranged sequentially downstream from said source of light in the direction of propagation of said beam of light:
    a collimator suitable for emitting a collimated beam of light at its output, the cross-section of which in a plane substantially perpendicular to the direction of propagation has a major dimension and a minor dimension, with divergence in the minor dimension of less than 1.5° of half-amplitude, and a beam shaper suitable for emitting a shaped collimated beam at its output the cross-section of which in a plane substantially perpendicular to the direction of propagation has a major dimension and a minor dimension and is suitable for making said major dimension substantially parallel to said major dimension of said field of view.

In the entire description and claims given below, the terms such as "parallel", "perpendicular", "coplanar", etc. are not to be understood in an absolute sense, but within a "standard" error interval known in the field of reference. This "non absoluteness" in the definition of the above terms may—even though it is not necessary—be underlined by the concurrent use of "substantially", so as to emphasize the non-absolute precision (the absolute precision cannot be achieved by any technology).

According to the first aspect, the invention relates to a linear reader of optical information based on imaging technology which comprises two main sub-systems: a receiving device based on a linear image sensor and an illumination device that includes a source of non-coherent light. The assembly of these two receiving and illumination devices is called hereinafter the image capture device or module.

The receiving device includes, in addition to the linear sensor, receiving optics (optical group) comprised by one or more lenses and, preferably, a rectangular aperture. Said optics determines the field of view and depth of field usable for the reading.

The field of view has a substantially rectangular cross-section, which defines a major and a minor dimension, where one of the two dimensions is preferably markedly larger than the other.

The illumination device includes a non-coherent source and a suitable optical group capable of projecting a beam of light having the desired "thin" line of light shape.

The shape of said line is designed to illuminate the entire linear sensor. In other words, depending on the type of sensor utilized, it is desired that all the photo-sensitive elements of the sensor be reached by a more or less large amount of light. Therefore, in the case of a linear sensor implemented, for example, as an array comprising a single line of photo-sensitive elements (pixels), it is desired that the line of light emitted from the illumination device "hits" each pixel, which implies that the line of light must be as long as, or longer than, the major direction of the field of view, while the thickness of the line of light can also be less than the thickness of the field of view, where the field of view is determined by a single pixel in the case of this embodiment.

In order to obtain a thin line of light, its thickness, that is to say its minor dimension, must necessarily be "small". In order to obtain this, the divergence of the beam of light emitted by the illumination device in the linear reader of the imager type along an axis is substantially comparable to that of laser systems (less than 1.5°) and is suitable for making the line appear to be "thin" at all distances.

Therefore, in the cross-section of a plane perpendicular to the direction of propagation, this beam of light emitted by the illumination device is a "rectangle" having one dimension greater than the other, and in particular greater by at least one order of magnitude. Furthermore, the beam of light is divergent in the major dimension; while in the minor dimension, as stated, the divergence is quite small. In this fashion, a substantially planar beam is obtained which is quite thin along the entire desired reading depth.

The ratio between the thickness of the line of light and the receiving field of view decreases as the distance increases until becoming essentially one for distances greater than a given value, such as a distance greater than 50 cm from the output of the linear reader (that is to say from an output of the illumination device which preferably coincides with the most external surface of the beam shaper in one of the directions of propagation of the beam of light). Given the small value of said ratio, it is necessary to take into consideration the problem of the alignment between the receiving device and the illumination device.

However, at the same time the linear reader of the imager type in the invention is a compact reader, so that the total number of sub-components are preferably kept as small as possible, which also tends to reduce the acceptable misalignment to a minimum.

For this reason, the linear reader of the imager type of the invention preferably includes an optical group in the illumination device without mirrors.

In order to obtain a good degree of alignment, the two illumination and receiving devices described above are arranged in such a manner that said optical receiving axis and said optical illumination axis are coplanar. As described hereinafter, the optical group of the illumination device additionally generates a beam at its output which, in a section perpendicular to the direction of propagation, has a major dimension substantially parallel to the major dimension of the field of view. For example, the field of view and the line of light define two substantially parallel rectangles in the cross-section perpendicular to the direction of propagation of the beam.

For example, in the case where both the receiving and illumination devices are mounted on one reader chassis, the two devices are preferably juxtaposed, and their respective optical axes are at the same height from a mounting plane of the chassis.

The structure of the illumination device must be one that satisfies contrasting requirements. In fact, as was previously mentioned it is desired that the reader be compact, which means that there are physical limitations in the actual dimensions of the individual elements comprising the illumination optics. In order to be compact, the optical group of the illumination device is preferably provided with few lenses of small dimension, with a short focal length, and the source of light itself preferably has small dimensions.

At the same time, however, the linear reader of the imager type in the invention is preferably efficient in collecting and redistributing the power emitted by the source of light, which in turn implies that the optical group of the illumination device preferably comprises lenses of large dimensions, with short focal length and high numerical aperture, and the source should have reduced dimensions.

The low divergence constraints (as stated less than 1.5°), at least in one direction of the beam of light forming a line or sliver of light produced by the illumination device, would in turn require the use of one or more lenses with a long focal length. For example, in order to obtain the thickness of the beam of light generated by the illumination device equal to or less than 15 mm at a distance of 500 mm from the output of the illumination device and utilizing as the source a LED having an area of emission of dimensions 500 µm×500 µm, the focal length of the optical illumination group must be at least 16 mm. Additionally, the requirements of sharpness of the projected line (reduced aberrations) would require the use of an optical group comprising several lenses with a low numerical aperture, and in addition said lenses would need to be much larger than the source of light.

According to the invention, in order to balance all these sometimes conflicting requirements, the optical group of the illumination device comprises the following characteristics:

A. A COLLIMATOR. In the present context, the collimator is defined as an assembly of one or more optical elements suitable for receiving an input beam of light, such as that emitted by the source of non-coherent light of the reader in the invention, and emitting an output beam collimated in at least one direction perpendicular to the direction of propagation of the beam of light itself. The collimator is suitable for emitting a beam collimated in at least said direction with divergence of less than 1.5° of half-amplitude, as per the above requirements. The collimator is suitable for collecting the power emitted by the source of non-coherent light, collimating it in the process in at least one direction in order to project an image of the source itself. Because the source is preferably "rectangular", the image itself will preferably be rectangular, so that the collimated beam will have a major or main dimension in a direction perpendicular to the low divergence dimension. The dimensions of the collimator are preferably limited by the given mechanical constraints of the illumination device, which has preferably to be compact because the reader has also preferably to be compact, as previously stated. Consequently, in order to achieve high efficiency, according to a preferred embodiment, the collimator is preferably placed very close to the source of light. Balancing the requirement of efficiency and desired focal length, it is then possible to determine the thickness of the collimator. In order to limit the aberrations as much as possible, in a preferred embodiment the surfaces of the collimator are aspherical, such as in a lens.

B. A BEAM-SHAPER (or beam former). It redistributes the power collected by the collimator in such a way as to create a uniform line of light having the desired divergence in one direction. In other words, the beam shaper is implemented in such a way as to make the beam going through it that was collimated by the collimator substantially parallel to a predefined direction, said direction being parallel to the major direction of the field of view. Therefore, the beam collimated by the collimator is "widened" in the major direction of the field of view by going through the beam shaper, thus redistributing the power. The beam shaper preferably includes two free-form surfaces (described by polynomial equations) which are vertically invariant.

In one embodiment of the invention the two optical devices, collimator and beam shaper, may be the sections of a single optical element, that is to say the optical group of the illumination device may be implemented as a single piece by a single element, where one input or output face or surface for the beam of light has the function of collimator and the second input or output face or surface has the function of beam shaper.

In this "single element" embodiment, the input surface preferably belongs to the section performing the beam shaper function, while the output surface belongs to the section performing the collimator functions.

Alternatively, the input surface preferably belongs to the section implementing the collimator function, while the output surface belongs to the section implementing the beam shaper. According to one variant, both the input and output surfaces have the double function of collimator and beam shaper.

In an alternative embodiment, the beam shaper and collimator are two functionally distinct and separate devices, or else functionally distinct but connected to each other, for example, by means of optically inactive mechanical components. Each one may include a single optical element or several elements, as described hereinafter. For example, the collimator (and/or the beam shaper) may be implemented as a single lens or as a combination of lenses.

Furthermore, also in this embodiment the specific arrangement of the beam shaper and collimator in sequence in the direction of propagation of the beam of light is arbitrary and depends on the specific implementation of the linear reader according to the invention; in other words, the collimator may be placed downstream from the source first and then followed by the beam shaper, or the beam shaper first along the light path of the light beam and then followed by the collimator. Therefore, the order in which the optical elements are listed is not mandatory; so the two elements may be interchanged.

According to all the above embodiments, the output beam of light from the illumination device is the collimated and shaped beam the cross-section of which in a plane substantially perpendicular to the direction of propagation has a major dimension and a minor dimension, with divergence in the minor dimension of less than 1.5° of half-amplitude, where said major dimension is substantially parallel to the major dimension of the field of view of the receiving device.

Preferably, both the collimator and beam shaper include an anti-reflective coating for the wavelength of the source of light in order to minimize the losses due to reflections inside the structure.

Preferably, the optical group of the illumination device does not include any other optical element acting on the beam of light emitted by the source, in addition to the collimator and beam shaper. Therefore, the use of only two optical devices limits the total volume of the optical group itself. More preferably, the collimator includes a single lens and/or the beam shaper includes a single lens. More preferably still, the optical group of the illumination device includes only two elements or lenses; the first having the collimator function and the second having the beam shaper function.

Additionally, said optical group permits having good collimation in a reduced space, preferably thanks to the aspherical surfaces utilized as well as good efficiency in collecting the emitted power thanks to the proximity of the collimator to the source. At the same time, the optical group of the illumination device preferably permits a sufficient degree of freedom to obtain a uniform line of light, thanks to the presence of the beam shaper dedicated for this purpose.

Moreover, decoupling between the issues of collimation of the beam of light emitted by the source and formation of the line of light (resolved by two separate optical devices, the collimator and the beam shaper, respectively) increases the degree of freedom available to implement the linear reader, while making the optical group of the illumination device resistant to the problems of relative placement of the collimator and beam shaper (because the collimated beam is already found at the output of the collimator, there is low sensitivity to the distance between the two lenses that implement the collimator and beam shaper, which is an advantage when assembling the optical group).

The divergence in the minor dimension in the cross-section of the light beam in a plane perpendicular to the direction of propagation, which is less than 1.5° of half-amplitude for the configuration of the collimator, is calculated as follows.

The divergence of the light beam in a given direction can be calculated from the measurement of the dimension of the projected line.

Given the dimension of the projected line and the dimension of the emitting surface (understood as the last surface of the optical projection system, that is to say the surface from which the light is effectively emitted; in a preferred example this means that the dimension of the collimated and shaped beam of light at the output of the beam shaper are taken) in the direction in which the divergence is to be calculated, there are two possible cases:

The projected beam of light has dimension (a) greater than the emitting surface (s) at any distance. This condition is represented in the enclosed FIG. 15a.

There is a distance from the projection system where the height (a) of the line is the same as that of the emitting surface (s). This condition is represented in FIG. 15b.

The method for measuring the angle of divergence, indicated as θ in FIGS. 15a and 15b, is the following:

The dimension of the projected line (a) is measured for at least two distances (p). Said dimension is defined as FWHM (Full Width at Half Maximum) of the profile of the line of light;

The equation of the straight line interpolating all the measured pairs of values (p, a/2) is calculated by linear regression. The equation of said straight line is a/2=m·p+q;

The angle of divergence is calculated
θ=arctan m).

The angle of divergence calculated in this manner is called the half-amplitude because it is half of the total angle subtended by the two straight lines joining the projected line with the emitting source.

The above described method is utilized for calculating the divergence resulting from the collimator in the linear reader of the present invention. The value of divergence less than 1.5° of half-amplitude in the minor dimension of the cross-section of the beam of light in a plane perpendicular to the direction of propagation is defined and calculated with the above described method. The minor dimension will also be referred to hereinafter as the "vertical" dimension. It is understood that the terms vertical or horizontal utilized in the present context do not reflect the actual position in the space of the reader during its use, which can be arbitrary.

Therefore, according to the invention the collimator is designed to obtain the desired vertical divergence, that is to say so that the thickness of the line of light is "thin"; the beam shaper is designed to even out the intensity of the line of light and obtain the desired angular amplitude in the horizontal direction (that is to say in the direction parallel to the major dimension of the field of view of the sensor).

Furthermore, even though the dimension of the beam of light at the output of the optical group of the collimator is strongly dependent on the divergence of the beam in the direction of the thickness, which as was stated is less than 1.5° in half-amplitude and is a result of the implementation details of the collimator, it is preferred that the collimator performs the collimation of the beam of light emitted by the source also in the direction perpendicular to the direction of the minor dimension (the horizontal direction). In fact collimation in the major or horizontal direction permits collecting a greater amount of power by the beam shaper and hence provides greater power in the beam of light at the output of the optical group of the illumination device. In order to obtain the same power at the output without also collimating the beam along the major direction, it would be necessary to have a beam shaper of large dimensions, which is not compatible with the reduced dimensions of the linear reader preferably required in this case.

In this first aspect, the invention may provide one or more of the following preferred characteristics, whether in combination or alternatively.

Preferably, said beam shaper is suitable for emitting a collimated shaped beam of light at the output with substantially uniform power along said major direction.

The beam shaper evens out the power emitted by the source along the entire length of the beam, that is to say substantially in the major direction defined by the cross-section of the beam in a plane perpendicular to the direction of propagation, so that the power of the line of light along said major dimension is substantially uniform.

Preferably, said beam shaper includes a lens having a positive focal length.

If the beam shaper includes a positive focal length lens, it means that the beam of light emitted by the source is first converging and then diverging in the horizontal dimension. This allows minimizing, choosing at the same time a proper position of a glass window of the reader, the amount of light coming from the source reflected onto the glass window and directed into the linear sensor.

Preferably, said beam shaper is invariant in the direction perpendicular to said minor dimension of said collimated shaped beam of light, so that said beam of light collimated in said direction remains unmodified.

More preferably, said invariant perpendicular direction of the beam shaper corresponds to the minor dimension of said collimated beam of light at the output of said collimator.

The action of the beam shaper on the collimated beam of light at the output of the collimator maintains the substantially invariant divergence in the direction of the minor dimension of the beam (the vertical thickness maintains the divergence from the output of the collimator), but "widens" the beam along the direction substantially parallel to the direction of the major axis of the field of view, the so-called horizontal direction. Considering that the field of view is a rectangle, the beam shaper lengthens the collimated beam of light in the direction of the major side of the rectangle defined in the field of view and leaves it substantially unmodified in the perpendicular direction.

Preferably, this direction of expansion is parallel not only to the major dimension of the field of view, but also to the major direction of the beam of light at the output of the collimator.

More preferably, said source of non-coherent light extends along a main direction, said main direction being substantially parallel to said major direction of said shaped collimated beam.

As previously stated, the beam shaper defines an axis along which the collimated beam of light is "widened", and this axis is implemented so that it is parallel to the major dimension of the rectangle defined in the cross-section of the field of view of the sensor.

In case there is an angle between the "widened" axis of the beam shaper and the main width direction of the beam at the output of the collimator, the collimated and shaped beam of light at the output of the beam shaper would have a thickness dimension greater than the collimated beam of light at the output of the collimator. Therefore, in order to keep the collimated and shaped beam at the minimum thickness dimension, it is preferable that the main dimension of the source is parallel to the axis of the beam shaper along which the beam of light is widened.

Preferably, this major direction common to the collimated beam and the shaped collimated beam is also parallel to the main extension axis of the source.

More preferably, said source of light includes a microLED.

It is known in the art that microLED sources, such as those based on GaN technology (Gallium Nitride), enable the implementation of emitter chips with very small dimensions, as described in WO2011/111079A1, which are suitable for implementing arrays that are capable of projecting very small patterns. In particular, it is known in the art that microLED sources lend themselves to the implementation of chips with rectangular form factors.

More preferably, said source of light includes a single microLED.

Alternatively, said source of light includes a linear array of microLEDs.

MicroLEDs have been recently developed to provide a new type of light source, preferably for a range of low-power applications. A microLED is generally built using standard LED materials and therefore has the spectral profile, flexibility and reliability of a standard LED. The microLED offers high efficiency as well as a unique light-controlling structure integrated onto the device during fabrication. In an example, a parabolic structure is created around the light-generation layer of the device. This structure controls the emitted light at the site of light generation and is far more efficient than using external optics after the light has escaped the chip.

In the design and fabrication of LEDs, the difference between the refractive index of the GaN material and that of air is a significant barrier to high-extraction light efficiency. In contrast to standard components, the microLED device uses this fundamental property of the material to enhance performance. Total internal reflection from the sidewalls of the parabolic structure within the microLED focuses the light toward the extraction surface; the design and shape of the sidewalls are accurately controlled to ensure that a high proportion of the light reaches the exit surface perpendicular to the interface. This results in minimal back-reflections, high light-extraction efficiency and good control of the beam shape.

Preferably said microLED source is rectangular, having a smaller first direction and a longer second direction.

In both cases, that is to say in the case where the source is implemented as a single source, or as a plurality of sources, said source of light preferably has dimension of between 5 µm and 300 µm in the first direction, more preferably between 5 µm and 50 µm.

In both cases, that is to say in the case where the source is implemented as a single source, or as a plurality of sources, said source of light preferably has dimension of between 100 µm and 3000 µm in the second direction, more preferably between 100 µm and 1500 µm.

Preferably, said first and said second directions are perpendicular to each other.

The "dimension of the source" is understood as the dimension of the "useful" part (or useful area) of the source, the image of which is being projected by the optics. The use of slits or apertures to form the shape of the beam placed in front or in contact with the source is also provided by the present invention; in this case the dimension of the beam at the output of the slit or aperture represents the dimension of the source.

Preferably, the major dimension (also referred to as the second or horizontal dimension) of the source is between 100 µm and 3000 µm. A source of larger dimension would produce a beam of light having dimensions that would make it unsuitable as the input to a collimator of "modest" dimensions, such as those required to implement a compact reader because a large portion of the power would be lost. Not least, a source with large dimensions comparable to the collimation optics would increase the aberrations present in the collimated beam, moving away from the ideal condition of a "point source". A smaller dimension would not allow a compact optical group to produce a line of light with sufficient power for reading the optical information at the desired distance.

In relation to the thickness of the source (which is the dimension along the first direction), because the produced line of light is preferably "thin", the minimum limit of 5 µm is given by the practical feasibility of the source of light (in theory the emitter line is as thin as possible, while maintaining an emitted power suitable for the application). The maximum limit of 300 µm is substantially a result of the constraints on the focal length of the collimator and the desired thickness of the projected line.

As shown in FIG. 14a, called "tv" the dimension of the light source, e.g. of the microLED, in the first direction (i.e. its thickness), "av" the thickness of the emitted light beam by the source at a distance "d" from the principal plane of the collimator of the illumination device, and "f" the focal length of the collimator, the following equation from geometric optics holds:

$$tv = (f \cdot av)/d.$$

Considering a line with maximum thickness av=10 mm at d=500 mm from the collimator and a maximum focal length f=15 mm for the collimator, the source of light will preferably have a maximum dimension "tv" equal to: 10*(15/500)=0.3 mm=300 µm. This calculation is purely paraxial, but the actual thickness of the line is greater as a result of the aberrations present, and in particular it can reach the 15 mm FWHM stated previously.

Preferably, a focal length of said collimator (22) is equal to:

$$f = (tv \cdot d)/av$$

Where $av \leq 15$ mm and $$d = 500 \text{ mm}.$$

In the same way described above, given the thickness "tv" of the source used and the maximum desired thickness of the light beam "av" at a distance "d", the focal "f" of the collimator has to be calculated from the same formula f=(tv*d)/av. Preferably, given therefore the distance d=500 mm and a light line having a thickness "av" 15 mm at such a distance d, and given the thickness of the non-coherent source "tv", the focal length f of the collimator is calculated according to the above formula.

Preferably, as mentioned, the source is a microLED thus a very "thin" "tv" is introduced in the formula. Having a thin source allows to select a still "reasonable" focal length "f" for the collimator in order to obtain a reasonable "thin" light beam at a distance of half a meter from the optics of the illumination device.

Preferably, the ratio between said dimension in said first direction and said dimension in said second direction of said source of non-coherent light is less than or equal to 1/5, more preferably less than or equal to 1/10, and even more preferably less than or equal to 1/20.

As previously stated, the optical group is preferably required to implement a substantially thin "rectangular" source suitable for generating the "strip" of light of the desired dimensions.

In a preferred embodiment, said linear sensor includes a linear sensor of the CCD type.

An alternative technology is possible, such as the use of a CMOS sensor.

The sensor preferably includes a linear array of CCD elements.

Preferably, the dimensions of the sensor are 1 pixel in height and length of between 1000 pixels and 3600 pixels, more preferably between 1500 pixels and 2500 pixels, and more preferably the length is 2500 pixels, that is the sensor is 1×2500 pixels.

Preferably, said source of light emits radiation in the spectrum of green, blue, or red light.

These wavelengths are chosen because of the technological constraints on existing sources; more preferably green is chosen because it is the radiation to which both the sensor and the human eye are most sensitive.

Advantageously, the focal length of said collimator is less than or equal to 15 mm, more preferably less or equal to 5 mm.

The maximum limit of the focal length f of the collimator is given by the practical feasibility of the lens or lenses comprising the collimator. The maximum limit is given by the dimension of the collimator itself, that is to say the requirement that the linear reader be compact.

In fact, the collimator preferably meets the following parameters:

Width of the collimator (that is to say one of its dimensions in a direction perpendicular to the direction of propagation of the beam of light corresponding to the major dimension of the beam) preferably 15 mm, more preferably less than 8 mm.
The minimum limit is given by the practical feasibility of the collimator;
The maximum limit is equal to the total width of the illumination device; in this case the maximum width of 15 mm is chosen for the implementation of a compact device.

Height of the collimator (that is to say one of its dimensions in a direction perpendicular to the propagation of the beam of light, perpendicular to the above stated direction and corresponding to the minor dimension of the beam) preferably 11 mm, more preferably less than 8 mm.
The minimum limit is given by the practical feasibility of the collimator;
Maximum limit equal to the total height of the illumination device; in this case the maximum height of 11 mm is chosen for the implementation of a compact device.

Depth (that is to say one of its dimensions in the direction of propagation of the beam of light) $D_1$:
The minimum limit is given by the practical feasibility of the lens,
The maximum limit given by the total depth of the illuminator and the thickness of the Beam-Shaper ($D_2$). The sum of the 2 thicknesses must be less than the total depth of the module ($D_1+D_2 \leq 15$ mm). In this case a maximum depth of 15 mm is chosen for the implementation of a compact device.

Similarly, the BEAM-SHAPER is preferably provided with the following parameters:

Width of the beam shaper (that is to say one of its dimensions in a direction perpendicular to the direction of propagation of the beam of light corresponding to the major dimension of the beam) preferably 15 mm
Minimum limit given by the practical feasibility of the beam shaper;
Maximum limit equal to the total width of the illumination device.

Height of the beam shaper (that is to say one of its dimensions in a direction perpendicular to the propagation of the beam of light, perpendicular to the above stated direction and corresponding to the minor dimension of the beam) preferably 11 mm
Minimum limit given by the practical feasibility of the beam shaper;
Maximum limit equal to the total height of the illumination device.

Depth (that is to say one of its dimensions in the direction of propagation of the beam of light) $D_2$:
Minimum limit given by the practical feasibility of the beam shaper,
Maximum limit given by the total depth of the illumination device and the thickness of the collimator ($D_1$). The sum of the 2 thicknesses must be less than the total depth of the illumination device ($D_1+D_2 \leq 15$ mm).

More preferably, said focal length of said collimator is between 1 mm and 6 mm.

In a preferred embodiment, the distance between said collimator and said source of light is between 0 mm and 15 mm, more preferably between 0 mm and 10 mm, and even more preferably the distance is less or equal to 3 mm.

The Back Focal Length (BFL—the distance between the collimator and the source of light) is preferably within the stated interval, where the minimum limit can be obtained by placing the collimator in contact with the source of light, while the maximum limit is given by the maximum focal length that can be implemented.

Advantageously, the sum of the maximum thickness of said collimator and the maximum thickness of said beam shaper in said direction of propagation of said beam is less than 15 mm.

The thickness of the collimator and/or the beam shaper is defined as the dimension of said collimator and/or beam shaper in the direction of propagation of the beam of light emitted by the source of light. Said thickness is minimized in order to make the linear reader compact.

In a preferred embodiment, said collimator and/or said beam shaper are implemented with a material having a high index of refraction. Preferably, said index of refraction is higher than 1.5.

The construction material of the beam shaper and/or collimator is preferably plastic, such as polycarbonate, for example having index of refraction equal to 1.59, which is higher than standard acrylic plastics like PMMA having index of refraction equal to 1.49.

The high index of refraction permits limiting the curvature of the surfaces of the beam shaper and/or collimator, again in order to minimize the mechanical volume of these two optical devices and meet the constraints of compactness.

Preferably, said optical receiving axis and said optical illumination axis are parallel and placed at a distance of less than 15 mm and, more preferably, less than 10 mm.

According to an alternative, the optical receiving axis and the optical illumination axis are convergent. More preferably, the optical receiving axis and the optical illumination axis are forming an angle comprised between 1° and 5°, more preferably of about 1.5°.

In order to reduce to a minimum the misalignment of the projected line with respect to the field of view close to the reader, it is preferable that the receiving and illumination devices be placed as close as possible to each other, and preferably with a center to center distance of less than 15 mm.

Furthermore, the field of view of the receiving device and the line formed by the beam of light emitted by the illumination device are preferably superimposed for a range of distances that is as wide as possible. At short distances from the reader, if the two illumination and receiving devices were spaced far apart from each other, the field of view and the line of light would not be superimposed. Therefore, the position of the optical receiving and illumination axes should ideally coincide. This preferably limits the dimensions of the optical groups of the two illumination and receiving devices, so that the small dimensions will limit the center to center distance.

Preferably, said collimator is suitable for emitting a collimated beam of light at the output having divergence in the minor dimension of less than 1° of half-amplitude.

As previously stated, it is desired to obtain a very thin strip of emitted light.

Advantageously, said field of view has a substantially rectangular cross-section that defines said major dimension and said minor dimension substantially perpendicular to each other.

Because the beam of light emitted by the illumination device has one dimension larger than the other, implementing in the process a sliver of light, the dimension of the field of view of the receiving device similarly has a rectangular cross-section which also forms a "strip" cross-section.

As per the discussion, the line of light and the field of view are preferably superimposed through the majority of the useful reading range of the linear reader of the invention.

More preferably, said field of view is less than 0.5° of half-amplitude along said minor direction of said field of view.

In this manner, the dimensions of the line of light and the field of view substantially coincide for a wide range of distances from the reader.

Advantageously, the reader includes a chassis, said receiving device and said illumination device being mounted adjacent to said chassis defining a mounting basement, said linear sensor and said source of light being arranged substantially perpendicular to said mounting basement.

The chassis is the support on which the various components of the reader are assembled, such as the illumination and receiving devices. It defines a mounting plane, given by two axes, X and Z, which are perpendicular to each other. The various devices are fastened to a basement parallel to this plane, referred to hereinafter as the horizontal plane, by gluing, for example. However, it should be understood that said plane (and thus the basement) can also be tilted with respect to the horizontal plane, in particular during the use of the reader; the plane is moved in order to position the reader itself in an optimal position with respect to the optical information to be read, so that the chassis may assume a plurality of positions in space, which may vary in time. The term "horizontal plane" is only utilized for convenience as a frame of reference.

The terms "parallel" and "perpendicular" are furthermore not to be understood in an absolute sense, but within the potential errors of assembly and alignment of the various components. Therefore, when two elements are said to be parallel or perpendicular, this is to be understood as within a range of error known in the art and prevalent in the reference technical field.

The linear sensor and the source of light are both mounted in a manner substantially perpendicular to the mounting plane. Alternatively, they may be mounted at an angle, up to an angle of 20°-30° with respect to the line perpendicular to the mounting plane. As previously stated, the optical axis of the sensor and the optical axis of the source are coplanar, and, preferably, said plane formed by the two axes is also parallel to the mounting plane. In this manner, the linear sensor and the source of light are preferably substantially at the same height with respect to the mounting plane of the chassis, that is to say they are substantially at the same distance along an axis perpendicular to the mounting plane defined on the chassis, e.g. the basement.

More preferably, said linear sensor is fastened on a printed circuit board mounted substantially perpendicular to said mounting basement, said linear sensor having its major direction of orientation substantially parallel to said mounting basement.

The linear sensor is advantageously arranged in a rectangular configuration. Its major direction of orientation is substantially parallel to the mounting plane of the chassis. Furthermore, the sensor is preferably mounted on a printed circuit board, or PCB, in order to be conveniently supplied and controlled.

Preferably, said illumination device includes a box housing comprising said collimator and said beam shaper, said box housing including, or being suitable for coupling to, means for regulating at least one angle of rotation around an axis of said box housing.

The optical group of the illumination device that includes the collimator and beam shaper is preferably assembled inside a box housing. As previously stated, because the collimator and beam shaper have a wide tolerance with respect to their mutual position, they may be pre-assembled in a mechanical structure such as the box housing without further checks.

Preferably, first the beam shaper is fixed to the box housing and then the collimator is translated towards and away the beam shaper till the correct position is reached.

Subsequently an alignment is preferably carried out with the source of light, which is in turn preferably mounted on a printed circuit board (PCB).

Preferably, the PCB on which the source is mounted is also perpendicular to the mounting basement defined by the chassis. Preferably the PCB of the source and the PCB of the sensor are parallel to each other and arranged on staggered planes.

In order to correctly perform the alignment between the illumination device and the receiving device so as to make the field of view of the latter substantially superimposed on the line defined by the beam of light emitted by the former for a range of distances from the linear reader as large as possible, it is preferable to actively perform an alignment between the devices. This alignment is advantageously carried out by keeping the receiving device fixed while rotating the illumination device with respect to the receiving device as required.

This rotation around one or more axes may be carried out by means outside the box housing, such as an external 3D manipulator, by means of a suitable configuration of the box housing itself, which can again be moved by means of an external manipulator, but slides and/or rotates on the chassis as a result of its geometric structure, making the alignment simpler.

More preferably, said illumination device comprises a box housing that includes said collimator and said beam shaper, said box housing including at least one mounting wall with which it is fastened to said chassis, said mounting wall being in contact with said mounting basement and having a geometric structure that allows rotating said box housing around at least one Cartesian axis.

Even more preferably, said chassis includes a seat suitable for coupling with said geometric structure of the mounting wall of said box housing.

In this embodiment, during the mounting, the box housing leans on, but is not fastened to, the mounting basement of the chassis. The geometric structure of a wall of the box housing is such that the box housing itself can rotate or slide on the mounting basement with ease thanks to the particular geometric structure of the wall itself.

For example, the geometric structure includes a protuberance, e.g. a cap, the shape of which couples to an indentation, e.g. a seat, implemented in the mounting basement. The mutual sliding between the wall of the protuberance and that of the indentation allows the required rotation or rotations of the overall box housing.

Alternatively, the "protuberance" geometric structure is present in the mounting basement of the chassis, while the indentation or seat is implemented in the box housing, and more precisely on one of its walls. The same shape coupling described above allows the necessary rotations.

Even more preferably, said mounting wall has a geometric structure that allows rotating said box housing around at least two Cartesian axes perpendicular to each other.

This rotation can be obtained in an embodiment by means of a suitable geometric structure in a wall of the box housing that includes the optical group of the illumination device. Even more preferably, said mounting wall is provided with a convex or concave shape facing towards said mounting basement of said chassis.

Said wall with a convex or concave shape facing towards the mounting basement permits a simpler rotation around various axes of the illumination device, both parallel and perpendicular to the mounting plane.

The convex or concave shape may be single or double; for example, said wall may include a portion of a cylindrical casing (a shape convex or concave in a single direction) or a portion of a spherical surface (a shape convex or concave in two directions) according to the number of Cartesian axes around which it is desired to obtain the potential rotations of the box housing.

In turn, the chassis includes a complementary convex or concave seat: in the case in which the box housing has a wall that is convex towards the mounting plane, such as a protruding spherical wall; the seat could, for example, include a ring for the sphere to rest on and rotate. Alternatively, the chassis may include a spherical wall in the form of an indentation or seat configured in such a manner that the wall of the spherical surface protruding from the box housing slides on the wall of the spherical surface of the indentation on the chassis.

Preferably, said box housing includes two axially opposite spherical caps.

More preferably, the two spherical caps are portion of the same sphere, that is, they are portion of a single sphere and thus having the same center. The two spherical caps are housed in corresponding seats, for example having a geometrical mating shape, realized on the chassis.

Preferably, the chassis includes a compressing element in contact to one of said spherical caps to compress the caps against the seats so that mutual sliding is prevented.

Preferably, the chassis includes an element which, when fastened to the rest of the chassis, compresses the caps onto the seats so that rotation is not possible any more of the caps in the seats and the illumination device is "blocked" in a selected position.

Such an element can be for example a cover which is inserted in projections or protuberances extending from the chassis and then fixed. More preferably, after the fixing, the cover and the basement are substantially one parallel to the other.

Preferably, the surfaces of the elements which are in contact, for example the surface of the spherical cap(s) and the surface of the seat or of the cover are rough so that relatively high friction is present when the surfaces are sliding one on the other.

Preferably, said box housing includes two spherical caps mating two corresponding concave seats in said chassis.

For example, also the cover includes a seat having the mating geometry to one of the caps in order to perform a simple rotation around any Cartesian axis.

Advantageously, said chassis includes an integrated receptacle for housing said optical group of said receiving device.

In one embodiment, the chassis includes an integrated receptacle for housing the optical group of the receiving device. Said optical group, which may, for example, be housed in a box housing, is then inserted into said housing and mounted firmly on the chassis.

In the aforementioned active alignment between the illumination device and the receiving device, the last one is therefore kept "still" solidly on the reference plane (mounting plane) defined by the chassis.

More preferably, said receptacle comprises a ring or a sleeve of resilient material in contact with one of the far extremities of said optical group facing out from said sensor.

When sliding the box housing, which is, for example, made of metal as is the chassis, of the optical group of the receiving device inside the receptacle implemented in one piece with the chassis itself, dust or other residue may form as a result of the friction between the two components. Said residue may potentially come in contact with the surface of the linear sensor located at the bottom of the receptacle. In order to prevent this deposit in the receptacle, and preferably at one of its ends that faces towards the sensor, a ring (such as a rubber ring) is present which serves as a gasket for any particle created by the friction of the walls of the box housing of the optical group with the walls of the receptacle, stopping it and preventing it from falling on the linear sensor.

Alternatively to the ring, preferably the receiving device has internal walls surrounding the sensor which are covered by an elastic sleeve.

Preferably the sleeve covers a major portion of the internal walls of the receptacle and is both elastic and black.

In said second aspect, the invention relates to a method for actively aligning the receiving device with respect to the illumination device or vice-versa.

Such method is applied to linear readers and more generally also to readers with a matrix sensor suitable for reading two-dimensional optical information. Said method permits having a very high degree of precision. For example, in the above described case of a linear reader, given the reduced dimensions of the projected line of light with respect to the field of view of the reader it was seen how the mechanical tolerances that can be achieved with the current technology are not sufficient to align the two illumination and receiving devices in order that the field of view and the line of light are superimposed as required.

In said second aspect, the invention relates to a method to actively align a receiving device including a sensor and an illumination device including at least one source of light suitable for emitting a beam of light, comprising:

Assembling said receiving device;

Stably fixing said receiving device on a chassis;

Actively aligning an optical group of said illumination device with respect to said source of light;

Fixedly connecting said optical group of said illumination device to said source of light;

Actively aligning said illumination device with respect to said receiving device; and Stably fixing said illumination device to said chassis.

In a reader of optical information it is desired to obtain alignment between the line of light obtained by means of the optical group of the illumination device and the field of view of the receiving device.

Given the construction tolerances, the actual condition may, however, exhibit errors of three types:

1) OFFSET: The line of light is not superimposed on that seen by the sensor. It is created when the optical plane of the illumination device is not parallel to the optical plane of the receiving device.

The optical plane of the illumination device is defined as the plane generated by the optical axis of the illumination device and the main direction of orientation of the beam emitted by the illumination device in a direction perpendicular to the propagation of the beam. It is substantially the plane where the beam emitted by the illumination device lays to a first approximation.

Similarly, the optical plane of the receiving device is defined as the plane generated by the optical axis of the receiving device and the main direction of orientation of the working field of the receiving device along a longitudinal cross-section. It is substantially the plane where the working field lies in an initial approximation.

An offset error results if the two planes are at an angle to each other and not parallel, and in particular the straight line defined by the intersection of the two planes is substantially perpendicular to the optical axis of the two devices. For example, in the case of a linear reader of the above described imager type according to the first aspect of the invention, it is preferable to obtain an angle between the two planes smaller than ±0.1°, while the mechanical tolerances permit reaching a precision of about ±3.5° without active alignment.

2) TILT: Also in this case, the optical plane defined by the illumination device is rotated with respect to the optical plane defined by the receiving device. In this case, the straight line defined by the intersection of the two planes is substantially parallel to the optical axes of the two devices.

For example, in the case of a linear reader of the above described imager type according to the first aspect of the invention, it is preferable to obtain an angle between the two planes smaller than ±0.1°, while the mechanical tolerances permit reaching a precision of about ±1.5° without active alignment.

3) DEFOCUS: The line of light is thicker than desired and is not sharp. It is created when the source of light is placed at the wrong distance with respect to the collimator or is rotated with respect to the beam-shaper. In other words, the main direction of orientation of the source does not coincide with the direction of the axis in which the beam shaper extends the collimated beam at the output of the collimator.

For example, in the case of a linear reader of the above described imager type according to the first aspect of the invention, it is preferable to obtain an error in the position of the collimator with respect to the source of light of less than ±10 μm (as a result of the relatively short focal length) and a rotation error of less than ±1°, which are achievable only with active alignment.

The Applicant has therefore established that similar required tolerances are achievable by means of the active alignment of the receiving device and the illumination device, comprising, for example, a linear reader of the imager type as described in the first aspect of the invention.

The proposed solution for the alignment exploits the characteristics of the chosen optical structure in order to reduce as much as possible the number of parameters that need to be adjusted actively.

The differences between an "active" alignment of some components in an optical device and a "passive" alignment are explained below. In the present description and claims, a passive alignment is defined as an alignment based only on the mechanical interfaces of the components comprising the optical device, together with their tolerances. On the other hand, an alignment is called active when it is based on the evaluation of one or more parameters of the quality of the alignment during the assembly stage, which provides for the relative movement between the components. The evaluation may be carried out both by means of instruments, that is to say carried out automatically by means of specially devised measurement instruments, or manual (for example visual), or manual and by means of instruments at the same time.

The receiving device is assembled in a first stage of the method according to the invention. The receiving device preferably has an optical group for correctly receiving the signal in order to correctly form the image of the optical information on the sensor. Said optical group is aligned passively and then assembled, for example, in a box housing.

Said box housing is then attached to the chassis, for example, the chassis of a linear reader of the imager type, turning the chassis and optical group assembly of the receiving device into a single block that is utilized as the frame of reference in the subsequent active alignment. In this stage the optical group of the receiving device of the sensor is aligned.

Alternatively, the box housing of the receiving device is an integral portion of the chassis itself. Therefore the "permanently fasten" step is performed also when the box housing of the receiving device is integral to the chassis.

Then the optical group of the illumination device is assembled. This alignment is passive. Preferably, the optical group of the illumination device is also inserted into a box housing. Alternatively, only an alignment of a portion of the optics is passive and the remaining is active.

The alignment that is then carried out between the assembled optics and the source of light, such as that mounted on a PCB, is preferably active.

Alternatively, the alignment of the optical group of the illumination device and of the source of light is performed together in an active aligning step.

After the alignment, the optical group of the illumination device and the source of light are attached to each other, for example, by fastening the PCB that carries the sensor to the box housing containing the optics.

Preferably the optical group is glued to the box housing, the light source is soldered to the PCB and the PCB is then fixed to an end of the box housing.

The second stage of the active alignment is then carried out by placing and aligning the illumination device with respect to the receiving device, while both are turned on and operating in order to allow the quality of the alignment between the devices to be monitored.

After the desired alignment has been achieved, the illumination device is also permanently fastened to the chassis.

The choice to optically align the illumination device with respect to the receiving device by keeping the last one fixed and attached to the chassis is a result of the reduced dimensions of the illumination device with respect to the receiving device, being therefore more manageable to rotate and move the first with respect to the second. Additionally, it is simpler to move the illumination device with respect to the receiving device while it is turned on because the first has a simpler electronic interface than the second.

Advantageously, the active alignment of the illumination device with respect to the receiving device includes rotating the illumination device. Checking the angular position of the illumination device is facilitated by a preferred shape of the structure (e.g. the box housing) that houses the optical group of the illumination device. In particular, the bottom surface of said structure, which is mechanically interfaced to the chassis that comprises the receiving imaging system, is preferably not planar but curved in order to facilitate the rotations themselves. More preferably, a seat is implemented in the mounting basement of the chassis in order to implement a shape coupling for sliding the structure provided with the specially devised geometric structure for the rotation. Similarly, the seat may be implemented in the structure housing the optics, and the geometric structure for the rotation may be created in the mounting basement of the chassis.

In the second aspect, the invention may have one or more of the following preferred characteristics, whether in combination or alternatively.

Preferably, assembling said receiving device and permanently attaching said device on a chassis includes:
  Mounting said sensor on an integrated circuit;
  Fixing said integrated circuit on said chassis;
  Mounting an optical group of said receiving device in a box housing; and
  Fixing said box housing on said chassis;

The optical group of said receiving device is considered a "module" that can be fastened to the chassis in a particular position. The optical group inside the box housing is preferably assembled by means of passive alignment. In a different embodiment, the box housing of the receiving device is integral to the chassis.

More preferably, fastening said box housing of said receiving device to said chassis includes:
  Actively aligning said box housing to said sensor by moving said box housing along a direction of translation.

Preferably, the sensor is fastened to a PCB that is mounted on the chassis. The optics of the receiving device is then assembled on a box housing that is also mounted on the chassis. Once the sensor is fastened, an active alignment of the box housing with respect to the sensor is preferably carried out during assembly, and the movement of the box housing containing the receiving optics is preferably only translation.

The sensor, for example a preferably linear sensor, is fastened to the chassis by means of a PCB.

More preferably, mounting an optical group of said receiving device in a box housing and fixing said box housing to said chassis includes inserting said box housing in a receptacle implemented integrally in said chassis.

The movement of translation during the active alignment of the box housing-sensor is therefore a "back and forth" movement (the distance between the optical group inside the box housing and the sensor is controlled actively) of the box housing inside the receptacle.

A preferred embodiment allows attaching the receiving device to the chassis by inserting the latter into a receptacle suitably implemented on the chassis itself, making the coupling simple and quick.

Advantageously, the active alignment of said optical group of said illumination device with respect to said source of light includes:
  Assembling said optical group of said illumination device in a box housing;
  Mounting said source of light on a printed circuit; and
  Translating or rotating said printed circuit with respect to said box housing in order to actively align said optical group of said illumination device with respect to said source of light.

Preferably, the alignment of the optical devices (for example, the lenses) comprising the optical group of the illumination device with respect to the source of light is carried out actively, for example, by moving the PCB on which the source of light is attached with respect to the lenses of the optical group of the illumination device. Said alignment may be carried out, for example, by performing a translation with respect to an axis in the mounting basement of the chassis and an axis perpendicular to it (Z and Y). Furthermore, said alignment may include a rotation around an axis in the mounting basement (rotation around the Z axis). This type of alignment corrects the problems of DEFOCUS and partially the problem of OFFSET, also compensating for the errors caused by the lack of control in the position of the source inside the package. Preferably, the alignment is performed by moving the PCB on which the source is attached with respect to the optical group of the illumination device.

Said optical group of the illumination device preferably comprises a beam shaper and a collimator provided with one or more of the characteristics described in the first aspect of the invention.

Preferably, said optical group includes a collimator and a beam shaper and wherein actively aligning said optical group of said illumination device with respect to said light source includes:
  Mounting and fixing said beam shaper in a box housing;
  inserting said collimator inside said box housing;
  Mounting said light source in a printed circuit; and
  Translating or rotating said printed circuit with respect to said box housing and translating or rotating said collimator so as to actively align said optical group of said illumination device with respect to said light source.

In this way, the active alignment is both of a component of the optical group and of the light source.

Preferably, the active alignment of said illumination device with respect to said receiving device includes:
  Rotating the optical group of said illumination device as a unit with said source of light with respect to said receiving device.

More preferably, the rotation of said optical group of said illumination device includes:
  Rotating said optical group of said illumination device around a first axis belonging to the mounting basement of said chassis, and/or
  Rotating said optical group of said illumination device around a second axis belonging to the mounting basement of said chassis substantially perpendicular to said first axis.

The alignment of the illumination device with respect to the receiving device is preferably carried out by rotating the illumination device with respect to the receiving device around two axes in the mounting basement, and more preferably without the need for translation movements. This step corrects the problems of the residual TILT and OFFSET intrinsic in the requirement for a thickness of the line comparable to the field of view of the reader.

According to said third aspect, the invention relates to a method for actively aligning a receiving device including a sensor and an illumination device including at least one source of non-coherent light, including:
- Assembling said illumination device;
- Permanently fastening said illumination device on a chassis;
- Actively aligning an optical group of said receiving device with respect to said sensor;
- Attaching said optical group of said receiving device to said sensor;
- Actively aligning said receiving device with respect to said illumination device; and
- Permanently fastening said receiving device to said chassis.

Alternatively, the active alignment according to the above described method in the second aspect of the present invention may be carried out before by attaching the illumination device to the chassis and then actively aligning it to the receiving device by moving the receiving device with respect to the fixed illumination device.

This active alignment is suitable for minimizing the errors of OFFSET, TILT, and DEFOCUS explained and exemplified in reference to the second aspect of the invention.

The illumination device is assembled in a first stage of the method according to the invention.

For example, the optical group of the illumination device is assembled first. This alignment is passive. Preferably, the optical group of the illumination device is inserted into a box housing.

The alignment that is then carried out between the optics assembled in the box housing and the source of light, such as that mounted on a PCB, is preferably active.

After the alignment, the optical group of the illumination device and the source of light are attached to each other, for example, by fastening the PCB that carries the sensor to the box housing containing the optics.

The illumination device assembled in this manner is then mounted on a chassis, for example, a chassis of a linear reader of the imager type, turning the chassis and illumination device assembly into a single unit that is utilized as the frame of reference in the subsequent active alignment. For example, the illumination device may be glued to the chassis.

The receiving device preferably has an optical group for correctly receiving the signal in order to correctly form the image of the optical information on the sensor. Said optical group is aligned passively and then assembled, for example, also in a box housing.

Said box housing is then attached to the linear sensor, for example, also mounted on a PCB.

The second stage of the active alignment is then carried out by placing and aligning the receiving device with respect to the illumination device, while both are turned on and operating in order to allow the quality of the alignment between the devices to be monitored.

After the desired alignment has been achieved, the receiving device is also permanently fastened to the chassis.

Checking the angular position of the illumination device is facilitated by the shape of the structure that houses the optical group of the receiving device. In particular, the bottom surface of said structure, which is mechanically interfaced to the chassis, is preferably not planar but curved in order to facilitate the rotations themselves. More preferably, a receptacle is implemented in the mounting basement of the chassis in order to implement a shape coupling for sliding the structure provided with the specially devised geometric structure for the rotation. Similarly, the receptacle may be implemented in the structure housing the optics, and the geometric structure for the rotation may be created in the mounting basement of the chassis.

According to a fourth aspect, the invention relates to a linear reader of optical information of the imager type, said reader including:
- a receiving device that includes a linear sensor and an optical group that defines an optical receiving axis and a field of view, said field of view having a cross-section with a major dimension and a minor dimension;
- an illumination device that includes at least one source of non-coherent light and an optical group that defines an optical illumination axis and is suitable for emitting a beam of light;

characterized in that
said optical receiving axis and said optical illumination axis are substantially coplanar;
said optical group of said illumination device comprises, arranged sequentially downstream from said source of light in the direction of propagation of said beam of light:
- a collimator suitable for emitting a collimated beam of light at its output, the cross-section of which that lies in a plane substantially perpendicular to the direction of propagation has a major dimension and a minor dimension, and
- a beam shaper suitable for emitting a shaped collimated beam at the output, the cross section of which that lies in a plane substantially perpendicular to the direction of propagation has a major dimension and a minor dimension, and is suitable for making said major dimension substantially parallel to said major dimension of said field of view so as to create a shaped collimated beam of light, said minor dimension being less than 15 mm at a distance of 500 mm from the output of said illumination device.

The linear reader of the imager type according to the fourth aspect of the invention has been configured to emit a "strip" of light that has a maximum thickness of less than 15 mm, and preferably less than 6 mm, at a distance of half a meter from the output of the illumination device. The thickness of the strip of light is calculated as its full width at half magnitude (FWHM) of the emitted beam in a cross-section of the beam in a plane substantially perpendicular to the direction of propagation of the beam of light itself. The second direction defined by the strip of light beam in a cross-section perpendicular to its thickness preferably has a dimension much greater than its thickness.

According to the fourth aspect, the invention relates to a linear reader of optical information based on imaging technology which comprises two main sub-systems: a receiving device based on a linear image sensor and an illumination device that includes a source of non-coherent light. The assembly of these two receiving and illumination devices is called hereinafter the image capture device or module.

The output of the illumination device preferably substantially coincides with the external surface of the beam shaper in the direction of propagation of the beam of light.

The receiving device includes, in addition to the linear sensor, receiving optics (optical group) comprised by one or more lenses and, preferably, a rectangular aperture. Said optics determine the field of view and depth of field usable for the reading.

The field of view has a substantially rectangular cross-section, which defines a major and a minor dimension, where one of the two dimensions is preferably markedly larger than the other.

The illumination device includes a non-coherent source and a suitable optical group capable of projecting a beam of light having the desired "thin" line of light shape.

The shape of said line is designed to illuminate the entire linear sensor. In other words, depending on the type of sensor utilized, it is desired that all the photo-sensitive elements of the sensor be reached by a more or less large amount of light. Therefore, in the case of a linear sensor implemented, for example, as an array comprising a single line of photo-sensitive elements (pixels), it is desired that the line of light emitted from the illumination device "hit" each pixel, which implies that the line of light must be as long as, or longer than, the major direction of the field of view, while the thickness of the line of light can also be less than the thickness of the field of view, where the field of view is determined by a single pixel in the case of this embodiment.

In order to obtain a thin line of light, its thickness, that is to say its minor dimension, is preferably "small". In order to obtain this, the divergence of the beam of light emitted by the illumination device in the linear reader of the imager type along an axis is preferably substantially comparable to that of a laser system and is suitable for making the line appear to be "thin" at all distances.

Therefore, in the cross-section of a plane perpendicular to the direction of propagation, this beam of light emitted by the illumination device is a "rectangle" having one dimension greater than the other, and in particular greater by at least one order of magnitude. Furthermore, the beam of light is divergent in the major dimension, while in the minor dimension, as stated, the divergence is preferably quite small. In this fashion, a substantially planar beam is obtained which is quite thin along the entire desired reading depth.

The ratio between the thickness of the line of light and the receiving field of view decreases as the distance increases until becoming essentially one for distances greater than a given value, such as a distance greater than 50 cm from an output of the linear reader (that is to say from the output of the illumination optics which preferably coincides with the most external surface of the beam shaper in one of the directions of propagation of the beam of light). Given the small value of said ratio, it is necessary to take into consideration the problem of the alignment between the receiving device and the illumination device.

At the same time, however, the linear reader of the imager type in the invention is a compact reader; therefore, the total number of sub-components must be preferably kept as small as possible, which also reduces the acceptable misalignment to a minimum.

For this reason, the linear reader of the imager type in the invention preferably includes an optical group in the illumination device without mirrors.

In order to obtain a good degree of alignment, the two illumination and receiving devices described above are arranged in such a manner that said optical receiving axis and said optical illumination axis are coplanar. As described hereinafter, the optical group of the illumination device additionally generates a beam at its output which, in a section perpendicular to the direction of propagation, has a major dimension substantially parallel to the major dimension of the field of view. For example, the field of view and the line of light define two substantially parallel rectangles in the cross-section perpendicular to the direction of propagation of the beam.

For example, in the case where both the receiving and illumination devices are mounted on one reader chassis, the two devices are preferably juxtaposed, and their respective optical axes are at the same height from the mounting basement of the chassis.

The structure of the illumination device must be one that satisfies contrasting requirements. In fact, as was previously mentioned it is desired that the reader be compact, which means that there are physical limitations in the actual dimensions of the individual elements comprising the illumination optics. In order to be compact, the optical group of the illumination device is preferably provided with few lenses of small dimension, with a short focal length, and the source of light itself should preferably have small dimensions.

At the same time, however, the linear reader of the imager type in the invention is preferably efficient in collecting and redistributing the power emitted by the source of light, which in turn implies that the optical group of the illumination device preferably comprises lenses of large dimensions, with short focal length and high numerical aperture, and the source should have reduced dimensions.

The low divergence constraints in at least one direction of the beam of light forming a line or sliver of light produced by the illumination device would in turn require the use of one or more lenses with a long focal length. For example, in order to obtain the thickness of the beam of light generated by the illumination device equal to or less than 15 mm at a distance of 500 mm from the output of the illumination device and utilizing as the source a LED having an area of emission of dimensions 500 μm×500 μm, the focal length of the optical illumination group must be at least 16 mm. Additionally, the requirements of sharpness of the projected line (reduced aberrations) would require the use of an optical group comprising several lenses with a low numerical aperture, and in addition said lenses would need to be much larger than the source of light.

According to the fourth aspect of the invention, in order to balance all these requirements, the optical group of the illumination device comprises the following characteristics:

A. A COLLIMATOR. In the present context, the collimator is defined as an assembly of one or more optical elements suitable for receiving an input beam of light, such as that emitted by the source of non-coherent light of the reader in the invention, and emitting an output beam collimated in at least one direction perpendicular to the direction of propagation of the beam of light itself. The collimator is suitable for collecting the power emitted by the source of non-coherent light, collimating it in the process in at least one direction in order to project an image of the source itself. Because the source is "rectangular", the image itself will preferably be rectangular, so that the collimated beam will have a major or main dimension in a direction with respect to the perpendicular direction. The dimensions of the collimator are preferably limited by the mechanical constraints resulting from the structure, which as was previously stated must be compact. Consequently, in order to achieve high efficiency, according to a preferred embodiment the collimator must be preferably placed very close to the source of light. Balancing the requirement of efficiency and desired focal length, it is then possible to determine the thickness of the collimator. In order to limit the aberrations as much as possible, in a preferred embodiment the surfaces of the collimator are aspherical, such as in a lens.

B. A BEAM-SHAPER (or beam former). It redistributes the power collected by the collimator in such a way as to create a uniform line of light having the desired divergence in one direction. In other words, the beam shaper is implemented in such a way as to make the beam going through it that was collimated by the collimator substantially parallel to a predefined direction, said direction being parallel to the major direction of the field of view. Therefore, the beam collimated by the collimator is "widened" in the major direction of the field of view by going through the beam shaper, thus redistributing the power. The beam shaper preferably includes two free-form surfaces (described by polynomial equations) which are vertically invariant.

In one embodiment of the invention the two optical devices, collimator and beam shaper, may be the sections of a single optical element, that is to say the optical group of the illumination device may be implemented as a single piece by a single element, where one input or output face or surface for the beam of light has the function of collimator and the second input or output face or surface has the function of beam shaper.

In this "single element" embodiment, the input surface preferably belongs to the section performing the beam shaper function, while the output surface belongs to the section performing the collimator functions.

Alternatively, the input surface preferably belongs to the section implementing the collimator function, while the output surface belongs to the section implementing the beam shaper. According to one variant, both the input and output surfaces have the double function of collimator and beam shaper.

In an alternative embodiment, the beam shaper and collimator are two functionally distinct and separate devices, or else functionally distinct but connected to each other, for example, by means of optically inactive mechanical components. Each one may include a single optical element or several elements, as described hereinafter. For example, the collimator (and/or the beam shaper) may be implemented as a single lens or as a combination of lenses.

Furthermore, also in this embodiment the specific arrangement of the beam shaper and collimator in sequence in the direction of propagation of the beam of light is arbitrary and depends on the specific implementation of the linear reader according to the invention; in other words, the collimator may be placed downstream from the source first and then the beam shaper, or the beam shaper first and then the collimator. Therefore, the order in which the elements are listed is not mandatory; so the two elements may be interchanged.

According to all the above embodiments, the beam of light at the output of the illumination device is a shaped and collimated beam the cross section of which in a plane substantially perpendicular to the direction of propagation has a major dimension substantially parallel to the major dimension of the field of view of the receiving device and a minor dimension with dimensions less than 15 mm at a distance equal to 500 mm from the output of said illumination device.

Preferably, both the collimator and beam shaper include an anti-reflective coating for the wavelength of the source of light in order to minimize the losses due to reflections inside the structure.

Preferably, the optical group of the illumination device does not include any other optical element acting on the beam of light emitted by the source, in addition to the collimator and beam shaper. Therefore, the use of only two optical devices limits the total volume of the optical group itself. More preferably, the collimator includes a single lens and/or the beam shaper includes a single lens. More preferably still, the optical group of the illumination device includes only two elements or lenses; the first having the collimator function and the second having the beam shaper function.

Additionally, said optical group permits having good collimation in a reduced space, preferably thanks to the aspherical surfaces utilized as well as good efficiency in collecting the emitted power thanks to the proximity of the collimator to the source. At the same time, the optical group of the illumination device permits a sufficient degree of freedom to obtain a uniform line of light, thanks to the presence of the beam shaper dedicated for this purpose.

Moreover, decoupling between the issues of collimation of the beam of light emitted by the source and formation of the line of light (resolved by two separate optical devices, the collimator and the beam shaper, respectively) increases the degree of freedom available to implement the linear reader while making the optical group of the illumination device resistant to the problems of relative placement of the collimator and beam shaper (because the beam is collimated, there is low sensitivity to the distance between the two lenses, which is an advantage when assembling the optical group).

Preferably, the collimator is suitable for emitting a beam collimated in at least one direction with divergence of less than 1.5° of half-amplitude.

The divergence in the minor dimension in the cross-section of the light beam in a plane perpendicular to the direction of propagation, which is less than 1.5° of half-amplitude for the preferred configuration of the collimator, is calculated as follows.

The divergence of the light beam in a given direction can be calculated from the measurement of the dimension of the projected line.

Given the dimension of the projected line and the dimension of the emitting surface (understood as the last surface of the optical projection system, that is to say the surface from which the light is effectively emitted; in this case the dimension of the collimated and shaped beam of light at the output of the beam shaper) in the direction in which the divergence is to be calculated, there are two possible cases:

The projected beam of light has dimension (a) greater than the emitting surface (s) at any distance. This condition is represented in the enclosed FIG. 15a.

There is a distance from the projection system where the height (a) of the line is the same as that of the emitting surface (s). This condition is represented in FIG. 15b.

The method for measuring the angle of divergence, indicated as θ in FIGS. 15a and 15b, is the following:

The dimension of the projected line (a) is measured for at least two distances (p). Said dimension is defined as FWHM (Full Width at Half Maximum) of the profile of the line of light;

The equation of the straight line interpolating all the measured pairs of values (p, a/2) is calculated by linear regression. The equation of said straight line is $a/2 = m \cdot p + q$;

The angle of divergence is calculated $\theta = \arctan(m)$.

The angle of divergence calculated in this manner is called the half-amplitude because it is half of the total angle subtended by the two straight lines joining the projected line with the emitting source.

The above described method is utilized for calculating the divergence resulting from the collimator in the linear reader of the present invention. The value of preferred divergence less than 1.5° of half-amplitude in the minor dimension of the cross-section of the beam of light in a plane perpendicular to the direction of propagation is defined and calculated with the above described method. The minor dimension will also be referred to as the "vertical" dimension. It is understood that the terms vertical or horizontal utilized in the present context do not reflect the actual position in the space of the reader during its use, which can be arbitrary.

Therefore, according to the invention the collimator is designed to obtain the desired vertical divergence, that is to say so that the thickness of the line of light is "thin"; the beam shaper is designed to even out the intensity of the line of light and obtain the desired angular amplitude in the horizontal direction (that is to say in the direction parallel to the major dimension of the field of view of the sensor).

Furthermore, even though the dimension of the beam of light at the output of the optical group of the collimator is strongly dependent on the divergence of the beam in the direction of the thickness, which is a result of the implementation details of the collimator, it is preferred that the collimator perform the collimation of the beam of light emitted by the source also in the direction perpendicular to the direction of the minor dimension (the horizontal direction). In fact, collimation in the major (horizontal) direction permits collecting a greater amount of power by the beam shaper, and hence provides greater power in the beam of light at the output of the optical group of the illumination device. In order to obtain the same power at the output without also collimating the beam along the major direction, it would be necessary to have a beam shaper of large dimensions, which is not compatible with the reduced dimensions of the linear reader required in this case.

In this fourth aspect the invention may provide one or more of the preferred characteristics, whether in combination or alternatively, already listed with respect to the first aspect of the invention. All characteristics detailed with respect to the first aspect are applicable to the fourth aspect as well.

Further, preferably, said collimator is suitable for emitting a collimated beam of light at the output having divergence in the minor dimension of less than 1.5° of half-amplitude.

More preferably, said collimator is suitable for emitting a collimated beam of light at the output having divergence in the minor dimension of less than 1° of half-amplitude.

As previously stated, it is desired to obtain a very thin strip of emitted light.

BRIEF DESCRIPTION OF THE DRAWINGS

These and additional advantages of the invention will become more evident from a detailed description in reference to the enclosed drawings, where:

FIG. 2 is a cross-section view from the top of the component of the linear reader in FIG. 1;

FIG. 16b schematically represents a cross-section of the working field in FIG. 16a;

FIG. 17b schematically represents a cross-section of the beam of light in FIG. 17a;

FIG. 18 is a perspective view of a second embodiment of a component of the linear reader implemented according to the invention;

FIG. 19 is a perspective view from the top of the component of the linear reader in FIG. 18 with an element removed;

FIG. 20 is a perspective view with a further element removed of the component of the linear reader of FIGS. 18 and 19;

FIGS. 22a and 22b are a front and a side cross sectional views of an illumination device of the linear reader of FIGS. 18-21;

FIG. 23 is a perspective view from the rear of the illumination device of FIGS. 22a and 22b;

FIG. 25 is a perspective view from the rear with an element removed of the component of the linear reader of FIGS. 18-21.

DETAILED DESCRIPTION OF THE PREFERRED EMBODIMENTS

Figure 13A:
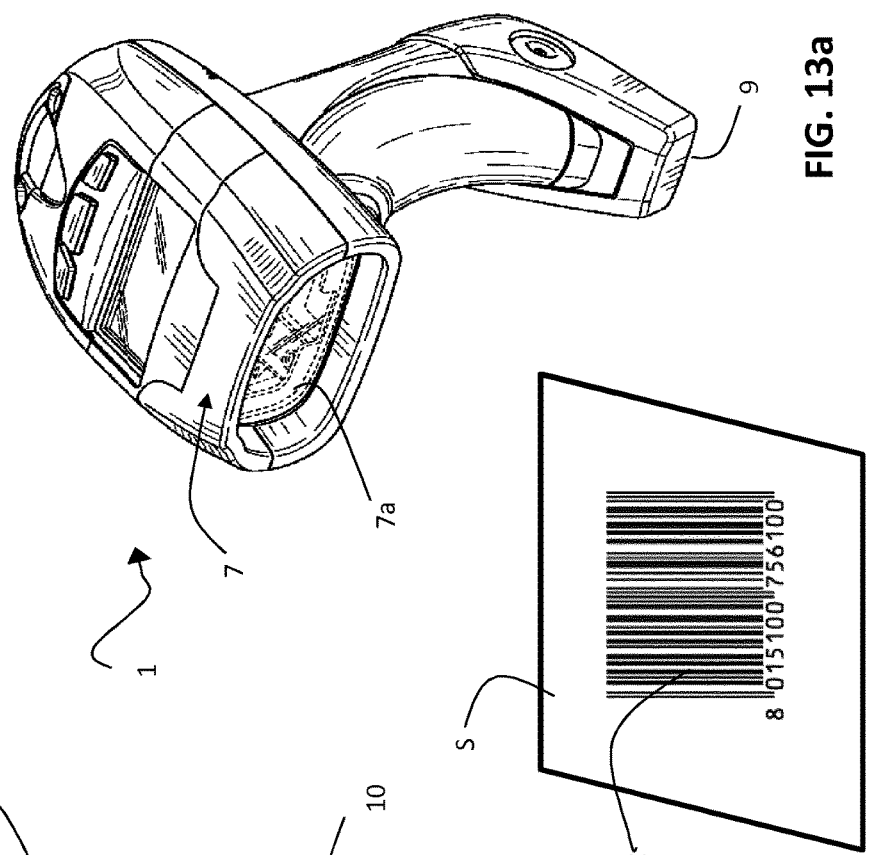
FIG. 13a represents a perspective view of a preferred embodiment of a linear reader implemented according to the invention.
Figure 13B:
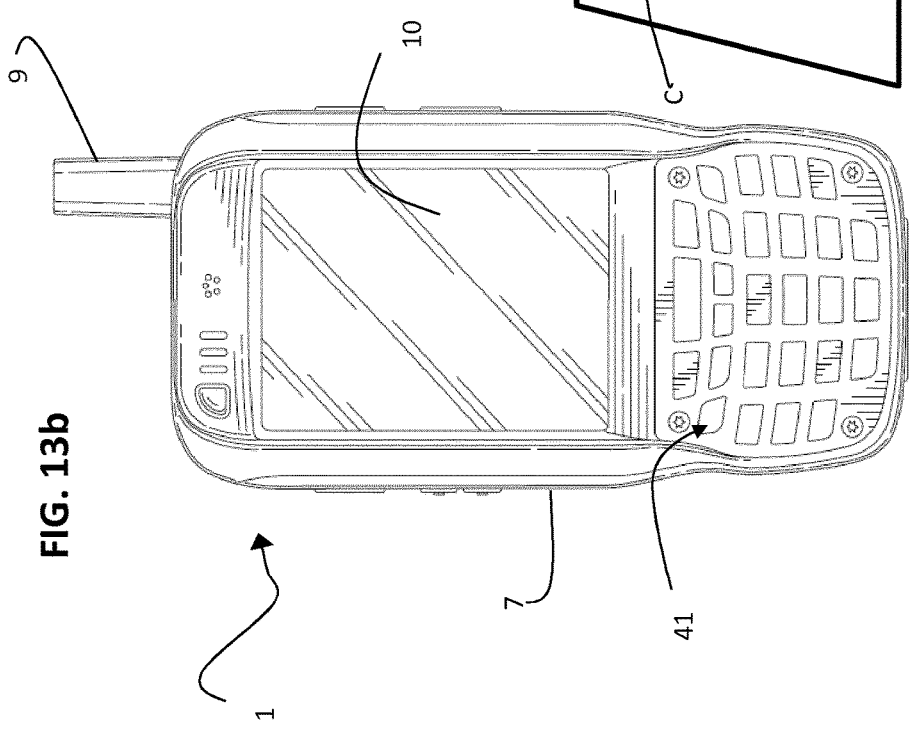
FIG. 13b represents a perspective view of an additional preferred embodiment of a linear reader implemented according to the present invention.

A linear reader of the imager type according to the invention is indicated as 1 in FIGS. 13*a* and 13*b*, according to its two preferred embodiments. The reader is preferably suitable for being held and utilized by the user in order to read the optical information, exemplified in FIG. 13*a* by a 1D optical code present on a substrate S, such as the packaging of a product. However, the reader may also be of another type, such as one mounted on moving or fixed automatic equipment.

In reference to FIGS. 2 and 18, reader 1 comprises a receiving device 2, 2' that in turn comprises a sensor 4 in the form of a sequential arrangement or linear array of photosensitive elements capable of generating an electrical signal starting from an optical signal, that is to say the light R emitted by the substrate S, which is modulated by the graphical elements present, and in particular by the code or other optical information C.

Receiving device 2, 2' further comprises image receiving optics 5, 5', capable of forming a sufficiently focused image of substrate S containing optical information C, or a region thereof, on sensor 4.

Reader 1 further comprises an illumination device 6, 6' that includes a source of light 18, 18' and an optical group 11, 11', suitable for projecting a beam of light T towards substrate S.

Receiving device 2, 2' and illumination device 6, 6' form a module called an image capture device, shown in a first embodiment 3 in FIGS. 1, 2, 4, and 7 and in a second embodiment 3' in FIGS. 18-25.

Reader 1 further comprises a processing and/or control device, which is not depicted in the figures, capable of extracting the information content from the image captured by image capture device 3, 3' or a portion thereof, for example, decoding code C, as well as controlling the other components of reader 1.

The processing and/or control device is in itself well known in the art and comprises hardware and/or software means for processing the signal emitted by linear sensor 4, such as filters, amplifiers, samplers, and/or quantizers, reconstruction modules, and/or optical code decoders, including look-up tables for potential codes, look-up tables for any type of unencrypted information associated with the potential codes, optical character recognition modules, etc.

The acquired and/or processed image, as well as the programming codes of reader 1, values of the processing parameters and said look-up tables, are typically stored in digital form in at least one, potentially removable, random and/or mass memory device (also not depicted), in reader 1.

Reader 1 may further comprise a communication device or interface 9 (for example, a plurality of contacts present on the end of the handle of reader 1, which are not visible in FIG. 13*a*, or the antenna in FIG. 13*b*), for transmitting the acquired image and/or information content extracted outside reader 1 and/or entering configuration data for reader 1 originating from an external source.

Reader 1 further comprises at least one output device 10 (for example the screen in FIG. 13*b*), for displaying to the user the alphanumeric and/or graphic information in connection with, for example, the operating state of reader 1, the content of the information read, etc., and/or for displaying the image presently captured by sensor 4. Output device 10 may comprise, alternatively or in addition, a printer, voice synthesizer or other output devices for the aforementioned information.

Reader 1 further comprises a manual input device 41, for example, a keyboard or plurality of keys or control levers, arrow keys, a mouse, a touch-pad, a touch screen, a voice command device, etc. (see, for example, the keyboard in FIG. 13*b*), for entering control and/or data signals, such as for configuring the reader.

Reader 1 further comprises at least one power supply device (not shown in the drawings, the power supply in these two preferred embodiments of linear readers 1 in FIGS. 13*a* and 13*b* is powered by a battery, hence they have connectors at their ends which contain contacts for charging their internal batteries (not shown), when placed on specially devised battery charger stands, also not shown in the enclosed figures, but known in the art) for supplying the various components with suitable levels of voltage and current, with a battery source, or by obtaining a power supply signal from the electric grid, or from an external device.

The processing and/or control device may be implemented by one or more processors; in particular one or more microprocessors or microcontrollers, and/or discrete or integrated circuit components.

Thus, above described reader 1 can be implemented as a single object, whereby the various components are housed in a housing 7 having a shape and dimensions suitable for being used, for example, at a mobile station and in particular suitable for being held by a user in order to read optical information; said case comprising at least one transparent region 7*a* for allowing passage of the emitted light T and received light R. The case and/or one or more internal supports are furthermore arranged to support the components of receiving device 2, 2' and illumination device 6, 6' in a mutually predefined configuration.

Vice-versa, output device 10 and/or manual input device 41 and/or the processing and/or control device could be implemented at least in part by a computer.

FIGS. 1 to 12 and 18-25 do not depict case 7, only the internal operating parts of linear reader 1 are represented; depicted in particular is image capture device module 3, 3', or portions thereof.

It is preferred that case 7 be particularly compact, which in turn implies that module 3, 3' must be particularly compact. For example, it is preferable that module 3, 3' have dimensions less than or equal to 21 mm×15.5 mm×11.5 mm, or less than 4 cm$^3$.

Figure 1:
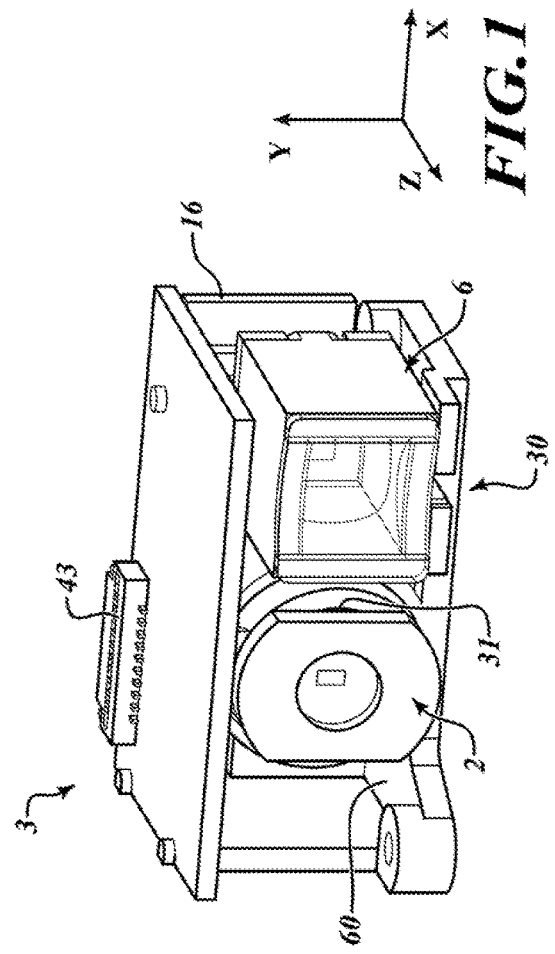
FIG. 1 is a perspective view of a component of a linear reader implemented according to the invention.

FIGS. 1 and 2 depict in greater detail, albeit schematically, image capture device module 3 according to the first embodiment of the present invention.

The module is implemented—as suggested by its name—in modular fashion so that it can be adapted to the most diverse types of reader by simply mounting it inside its case 7. Assembly of module 3 is particularly simple; for example, module 3 may be provided with holes 42 for mounting screws on case 7, as well as an interface connector 43 for electrically connecting module 3 to reader 1. For example, connector 43 delivers the power supply to module 3, which controls it, as well as an output signal that may be the electric signal directly generated by sensor 4 or a signal after processing, such as in binary format.

As can be seen, receiving device 2 and illumination device 6 are both fastened on a chassis 30 of module 3, from which a system of coordinate axes is defined.

For example, metal constructed chassis 30 includes a mounting basement (60) which defines a mounting plane (X, Z), called the horizontal plane, on which image formation device 3 is mounted, including receiving device 2 and illumination device 6, and a perpendicular axis Y, called the vertical axis.

Receiving device 2 includes linear sensor 4 (depicted in the cross-section in FIG. 2), which comprises, for example, an array of photosensitive elements, each one of which supplies an electric signal, the intensity of which is proportional to the incident light on it.

For exemplification purposes, FIGS. 1 and 2 depict a rectangular aperture linear sensor 4, which therefore has a main axis of orientation. For example, sensor 4 may be implemented in CMOS or CCD technology.

For example, the sensor is a linear image sensor having height of one pixel and width equal to 2500 rectangular pixels with dimensions of 5.25 µm×64 µm each. In general, linear sensor 4 has a main dimension and a minor dimension.

Preferably, linear sensor 4 is mounted on a printed circuit board, or PCB 16, which is in turn mounted on chassis 30, for example, perpendicularly to the plane (X, Z) in such a way that the main axis of orientation of linear sensor 4 is substantially parallel to plane (X, Z). In the figures said main axis is drawn parallel to the X axis for convenience. The height of the sensor with respect to the reference plane (X, Z) is called H (see FIG. 7).

As previously stated, receiving device 2 comprises receiving optics 5 designed to form on linear sensor 4 an image of substrate S that contains optical information C, or a region thereof. Receiving optics 5, displayed in their entirety only in FIG. 2 and removed from the other figures, may comprise one or more lenses, one or more diaphragms, refractive, reflective, or diffraction optical elements, which are potentially anamorphic in order to modify the effective form factor of linear sensor 4.

Receiving optics 5 is preferably assembled in a box housing 12, such as one constructed in metal. Chassis 30 preferably includes an integrated receptacle 31 implemented in one piece with chassis 30, in which box housing 12 is inserted. When inserted, one of the far ends 12a of box housing 12 faces PCB 16 and sensor 4.

Far end 12a is furthermore inserted into a ring 14 that functions as a gasket and is suitable for preventing the deposit of dust residue on the surface of sensor 4 during the insertion of box housing 12. Said ring is preferably made of rubber.

Receiving device 2 defines a working region of space 15 that extends in front of sensor 4. Working region of space 15 is the region of space where optical information C is correctly framed by sensor 4, and its image is sufficiently in focus on sensor 4. Within this working region of space 15, the optimal focus plane may be fixed or made variable by means of an autofocus system. In the depicted preferred embodiment, the focus plane is fixed.

Figure 4:
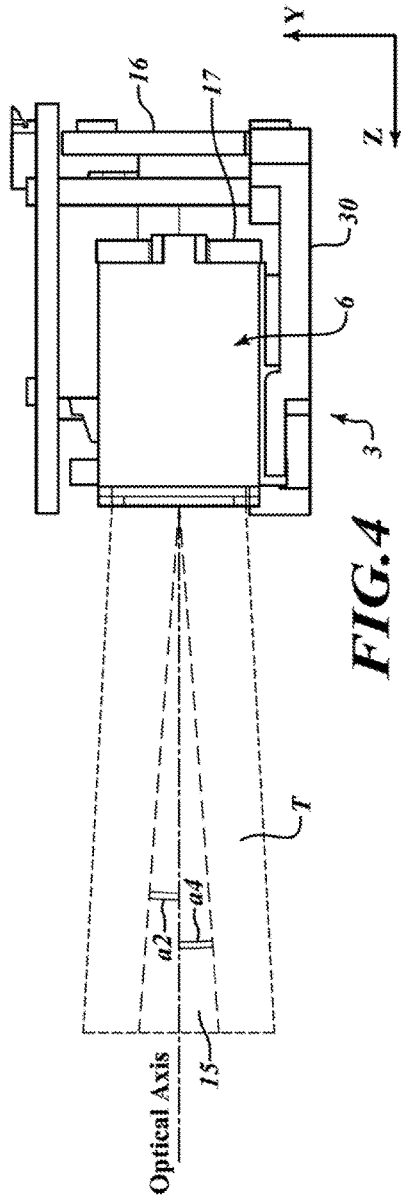
FIG. 4 is a side view of the component in FIGS. 1 and 2 during operation.
Figure 16A:
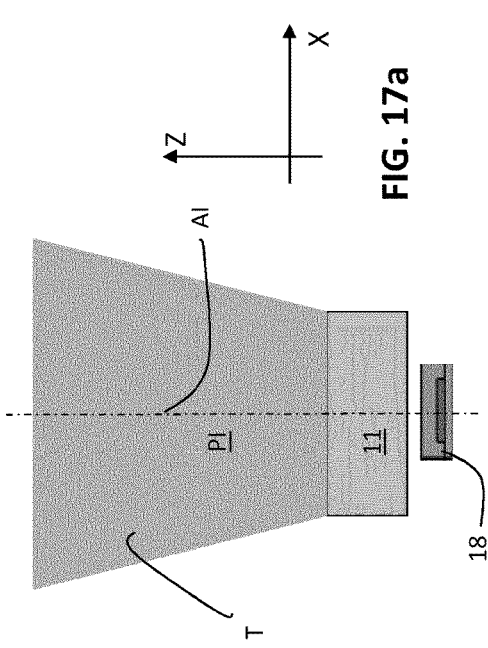
FIG. 16a schematically represents a view from the top of the working field of the receiving device of the reader implemented in accordance with the present invention.
Figure 16B:
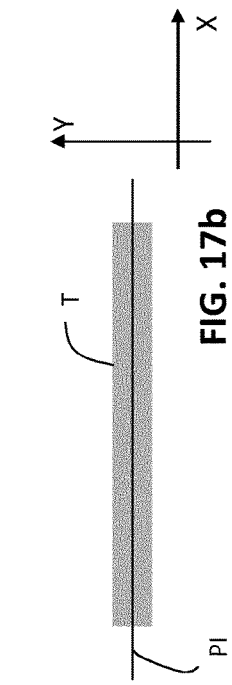
Figure 15B:
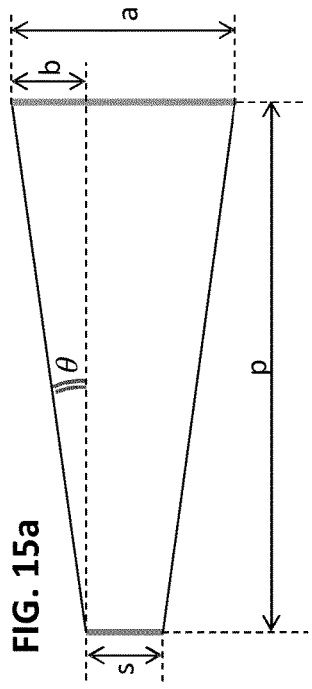

In the represented case of a rectangular linear sensor 4, working region of space 15 is pyramidal or pyramid section; where the sensor is substantially monodimensional, the base of the pyramid becomes markedly narrower, and the working region 15 may be considered to be substantially flat (the "triangle" with label 15 in FIG. 4 represents the working field where its divergence has been exaggerated in one direction). In the cross-section, the area defined by working field 15 is substantially rectangular, where one side of the rectangle is preferably much greater than the other. FIGS. 16a and 16b schematically represent the working plane.

Furthermore, receiving device 2 defines an optical receiving axis AR, for brevity's sake receiving axis AR. Receiving axis AR is identified by the center of the elements of receiving optics 5, or by the centers of curvature of the optical surfaces in the case of a single lens. Preferably, receiving axis AR is orthogonal to sensor 4.

Preferably, as a result of the manner in which optical group 5 and sensor 4 on PCB 16 are mounted, said receiving axis AR is parallel to the mounting plane (X, Z). In reference to FIGS. 16a and 16b, receiving device 2 defines the angular amplitude of the working region 15 (or field of view) around optical receiving axis AR, which is typically expressed in terms of two angles having the origin at a receiving vertex and one of the sides that coincides with receiving axis AR, and extended in four half-planes perpendicular to each other. In reference to the two main directions of sensor 4, that is to say the row and column directions of its photosensitive elements, we can speak of a "horizontal" field of view expressed by angles a1, a3 and a "vertical" field of view expressed by angles a2, a4 (these two angles are also visible in FIG. 4, where they are drawn not to scale and with a value much greater than that assumed in the present invention). Working region of space 15 in the illustrated embodiment is preferably provided with symmetry and therefore a1=a3 and a2=a4, in absolute value.

Furthermore, because sensor 4 is monodimensional, the "vertical" field of view is much smaller than the "horizontal" field of view, that is to say each section of the field of view defined by a plane perpendicular to optical axis AR is rectangular (said section of field of view 15 is represented not only in FIG. 16b but also by the rectangles in FIGS. 5, 6, 7, 8) where one dimension is much greater than the other. Preferably, a2 and a4 are less than or equal to 0.5°.

Receiving device 2 further defines a depth of field, which expresses the extension of working region of space 15 along receiving axis AR.

Assuming substrate S at a general reading distance B from reader 1, while the minimum and maximum reading distance from the substrate are called B1 and B2, respectively, the depth of field is therefore=B2−B1. The depth of field varies according to the type of code.

Therefore, the field of view also defines a plane of view PR of receiving device 2, said plane being defined by the optical receiving axis AR and the direction having the greater dimension in the cross-section of the working field, which preferably substantially coincides with the direction of the main axis of orientation of sensor 4. This plane PR defined by axes AR and X is represented in FIG. 16a.

Illumination device 6 of image capture device 2 of imager optical information reader 1 comprises a source of light 18 suitable for emitting a beam of non-coherent light. In a first embodiment, said source of light is a single source. Alternatively, the source of light comprises an array of sources arranged next to each other.

Preferably, said source includes a microLED and, more preferably, a microLED that emits radiation in the range of green or blue or red light, and, even more preferably, in the range of green light. The microLEDs are micro-emitters, implemented, for example, with Gallium nitride (GaN) technology, with the major linear dimension of the emission area equal to about 20 micrometers, but presently also up to 4 micrometers; with this technology it is possible to implement an array containing thousands or tens of thousands of sources of light 18 of very small dimensions (for example, a few mm on a side for an array of 512 light emitting elements) and with very low costs and power consumption. Said devices are further capable of emitting at different wavelengths.

Source of light 18 is preferably rectangular and more preferably has the following dimensions:
Height of the source between 5 µm and 300 µm,
Width of the source between 100 µm and 3000 µm,
and wherein the ratio between height and width is preferably less than 1/5 (that is to say where height and width are preferably chosen within the given interval, but maintain in any event a ratio less than 1/5), and more preferably less than 1/10. Preferably, that source 18 is arranged so that its major dimension (the width) is positioned substantially parallel to plane (X, Z). For example, source 18 is mounted on an additional PCB 17, which is in turn mounted on a box housing 24, in turn mounted on chassis 30. Preferably, PCB 16 and PCB 17 face each other and partially overlap but without touching and, more preferably, are parallel to each other. Furthermore, source 18 and sensor 4 may advantageously also turn out to be parallel to each other, having their respective major axis of orientation substantially parallel to each other.

Illumination device 6 further includes an illumination optics 11, suitable for modifying the beam emitted by source 18 and transforming it into a "line" of collimated light substantially divergent in a single direction, with the major axis of orientation parallel to the major direction in the cross-section of field of view 15.

Illumination optics 11 includes a collimator 22 and a beam shaper 23, arranged in this order along the direction of propagation of the beam of light emitted by source 18. Preferably, the parameters of the collimator and beam shaper are chosen in the following manner (see FIGS. 3*a* and 3*b*):
Collimator:
Width $L_1$: ≤15 mm
Height $H_1$: ≤11 mm
Depth: $D_1$
If the thickness of the Beam-Shaper is called $D_2$, the sum of the 2 thicknesses must be less than the total depth of the module ($D_1+D_2$ 15 mm).
Focal length: less than 15 mm
Back Focal Length (BFL—distance between the collimator and the microled): 0 mm-15 mm,
Beam-Shaper:
Width $L_2$: ≤15 mm
Height $H_2$: ≤11 mm
Depth: $D_2$
The sum of the 2 thicknesses $D_1$ and $D_2$ must be less than the total depth of the module ($D_1+D_2$≤15 mm).

Figure 3A:
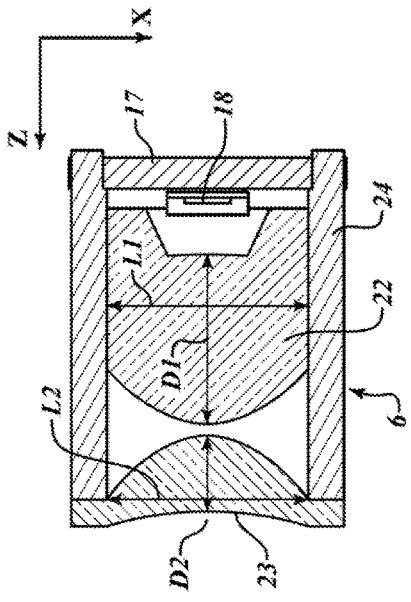
FIGS. 3a and 3b are respectively a cross-section side view and a cross-section view from the top of an illumination device of the linear reader in FIG. 1.
Figure 3B:
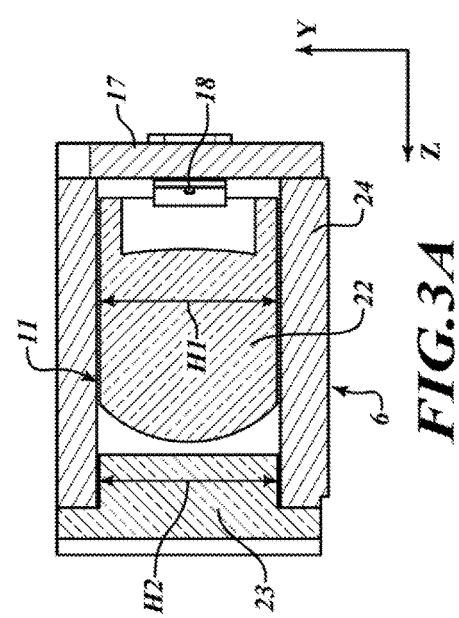

Preferably, collimator 22 and beam shaper 23 each include a single lens, so that illumination device 6 in turn includes only two lenses, as depicted in FIGS. 3*a* and 3*b*.

Collimator 22 takes care of collecting the power emitted by the source by collimating it in order to project an image of the source itself. In particular, the collimator is designed so as to collimate the light emitted by the source in one direction, obtaining a divergence of less than 1.5° of half-amplitude, and more preferably less than 1° of half-amplitude. Therefore, the collimated beam at the output of the collimator has a directional divergence of less than 1.5° of half-amplitude, where this direction is the direction of minor extension of the collimated beam. Preferably, said minor extension is also parallel to the minor extension of source 18.

Furthermore, it is preferable that collimator 22 in any event also perform a collimation in a direction substantially perpendicular to the minor direction, that is to say substantially in the direction of the main orientation of the source of light (also called the horizontal direction, which is preferably parallel to the (X, Z) plane). This dimension is called the major dimension of the collimated beam at the output of the collimator.

The dimensions of the collimator are limited by the mechanical constraints of the structure. As a result, in order to obtain the high efficiency, it is necessary to position said collimator very close to source 18. Balancing the requirement of efficiency and desired focal length, it is then possible to determine the thickness $D_1$ of collimator 22. In order to limit the aberrations as much as possible, it is preferable that the surfaces of the lens comprising collimator 22 be aspherical and that the aperture of the lens be additionally less than the mechanical constraints. The material of the collimator is preferably a high index of refraction plastic, such as polycarbonate, in order to limit the required curvature of the surfaces.

An example of a design based on a source of 25 µm×1000 µm is provided with a lens comprising collimator 22 with a width of 5 mm, height of 4 mm, thickness of 4.5 mm and placed at a distance of 1 mm from source 18. The aperture of the first surface of the lens comprising collimator 22 facing source 18 is 2 mm wide and 3 mm high. In this case the focal length is between 3 mm and 4 m, and the line generated at the output of optical system 11 has thickness between 5 mm and 6 mm at a distance of 500 mm from illumination device 6 (in particular the distance is measured from the point where the beam of light exits the beam shaper). At the same distance, the thickness of the line "seen" by receiving device 2 has a thickness of about 3 mm, which requires that the alignment error be less than ±1 mm (±0.1°). Beam shaper 23 takes care of redistributing the power collected by the collimator in order to generate a uniform line of light having the desired divergence. It is provided with two surfaces preferably of the free-form type (described by polynomial equations) which are vertically invariant (that is to say along the Y axis). As for the collimator, the material of the beam shaper is also preferably a high index of refraction plastic, such as polycarbonate, in order to limit the required curvature of the surfaces.

In the aforementioned design example, beam shaper 23 has width of 5 mm, height of 4 mm, central thickness of 2 mm, and is placed about 500 µm from collimator 22.

Beam shaper 23 makes the main axis of orientation of the beam of light collimated by collimator 22 substantially parallel to the direction of the main dimension of field of view 15; in other words, it is suitable for generating a collimated shaped beam of light T provided with a major direction parallel to the major direction of field of view 15 in a plane perpendicular to the direction of propagation in its cross-section.

Figure 5:
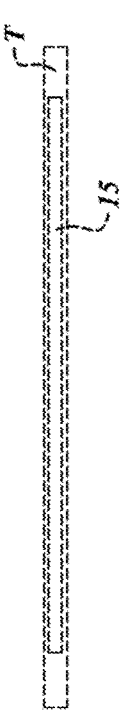
FIG. 5 is a schematic representation of the ideal alignment between the emitted beam and the field of view that can be obtained by means of the method of the invention.

Therefore, as can be seen in FIG. 5, the main axes of major extension of the beam of light at the output of the beam shaper and the field of view are parallel to each other.

Preferably, they are also parallel to the main axis of orientation of source 18, as well as linear sensor 4.

Preferably, both lenses 22, 23 comprising the collimator and the beam shaper are provided with an anti-reflective coating for the wavelength of the source in order to minimize the losses due to reflections inside the structure.

As in the case of optics 5 of receiving device 2, optics 11 of illumination device 6 also define in the same manner an optical axis AI, which preferably goes through the geometric center of source 18 and is, for example, also substantially perpendicular to it.

Figure 17A:
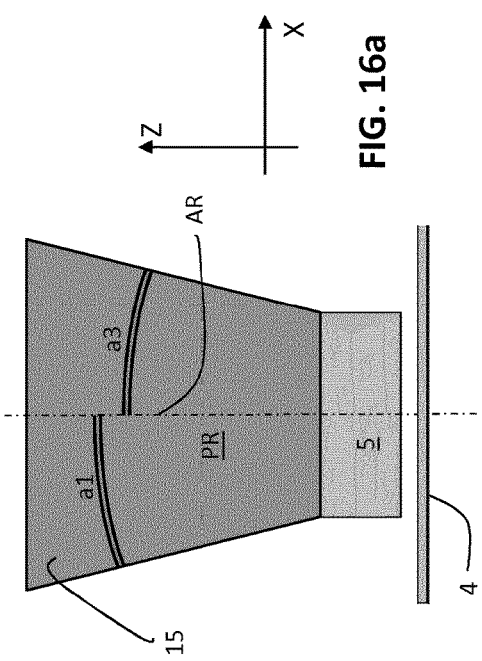
FIG. 17a schematically represents a view from the top of the beam of light emitted by the illumination device of the reader implemented in accordance with the present invention.
Figure 17B:
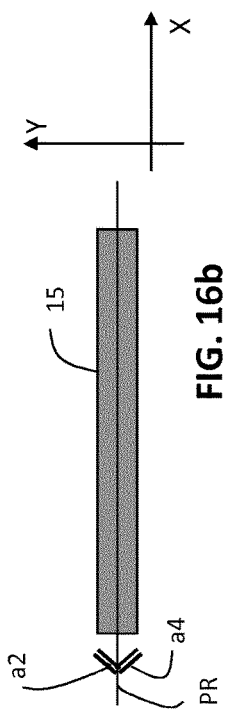

Similarly to receiving device 2, beam of light T emitted by the illumination device defines a plane of illumination PI, given by the plane generated by optical axis AI and the main direction of orientation of beam of light T emitted by illumination device 6. As per field of view 15 in FIGS. 16a and 16b, this is outlined in FIGS. 17a and 17b.

Plane PI is preferably parallel to the mounting plane (X, Z). This alignment is given by the shape of beam shaper 23.

Optics 11 comprising collimator 22 and beam shaper 23 are also preferably assembled in box housing 24, where PCB 17 including source 18 is fastened at the far end thereof. Box housing 24 is therefore fastened, for example glued, to chassis 30.

Once the distance from the source 18 is set, it is possible to calculate the dimension of optics 11 needed to obtain a certain thickness of the line projected at a certain distance, as the focal length of collimator 22 is varied, according to the formula:

$$\text{thickness of source} = \frac{\text{focal length}}{\text{distance}} \cdot \text{line dimension}$$

Figure 14A:
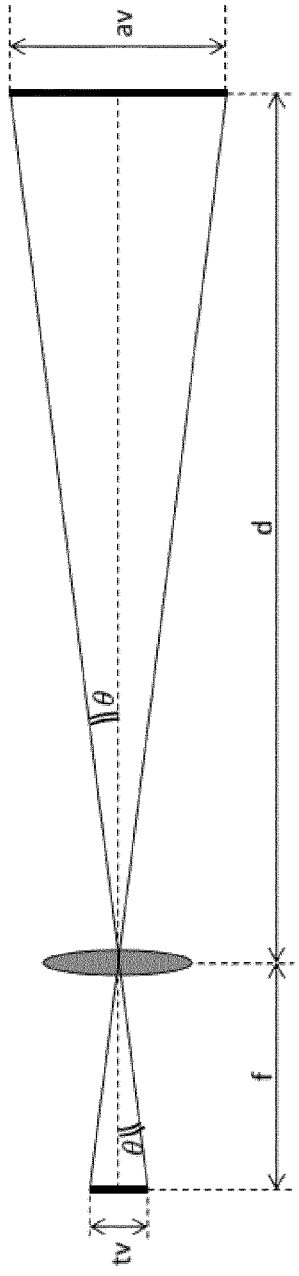
FIG. 14a is a schematic drawing of the relationship between dimension of the source of light, focal distance and dimension of the line of light.

This equation is graphically represented in FIG. 14a. The thickness of the source 18 is indicated with "tv", the focal length "f", the distance "d" from collimator 22 and the thickness of the light beam at distance d with "av". This calculation is valid for the paraxial approximation: the real dimension of the projected line is determined by the aberrations and is greater than the paraxial approximation.

In one embodiment, collimator 22 has a focal length f of about 3.5 mm and is obtained with a source with thickness tv of 25 μm, therefore generating a line having a thickness av of about 3.5 mm at 500 mm. In reality the thickness of the line (defined as FWHM, Full Width Half Maximum) is about 5 mm (the increase of 30% is the addition caused by the aberrations).

Figure 14C:
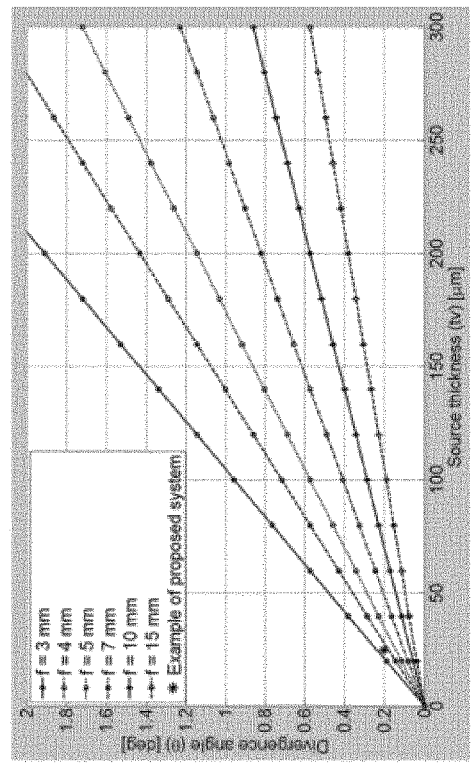
FIGS. 14b and 14c represent two graphs of the thickness of the beam of light emitted by the illumination device in relation to the dimension of the source of light and in relation to the focal length of the collimator or of the divergence angle, respectively, at a distance equal to half a meter from the collimator.
Figure 14B:
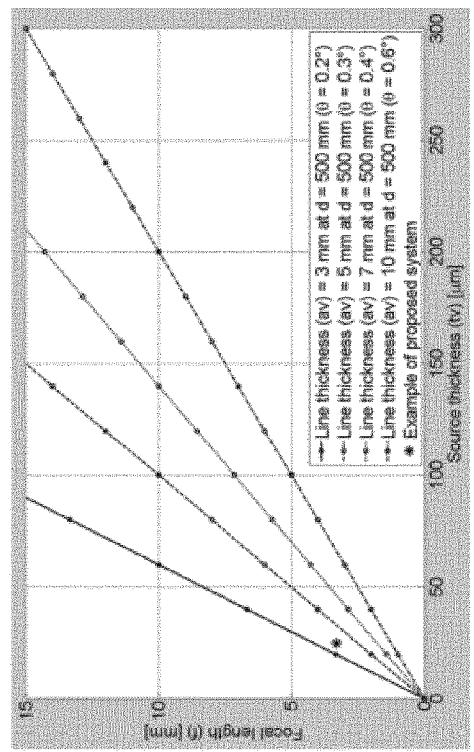
Figure 15A:
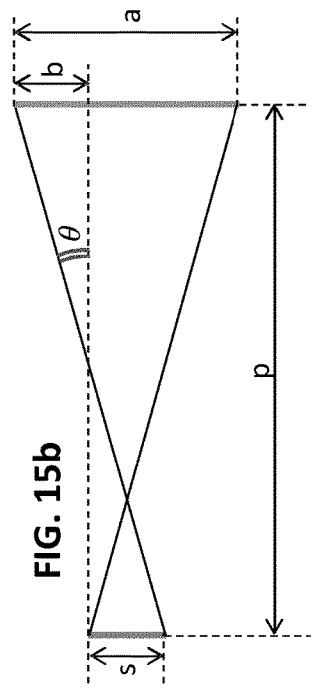
FIGS. 15a-15b schematically represent the methods that must be applied in the present invention for calculating the divergence of the beam of light emitted by a source of light.

Different thicknesses of the line of beam T in relation to the thickness of source 18 and the focal length of optics 11 are displayed in the graph in FIG. 14b. Each straight line having a different slope in the graph represents a line of light with a different thickness. Four thicknesses are shown (from the top to the bottom): 3 mm, 5 mm, 7 mm, and 10 mm. The preferred embodiment chosen and displayed in the figures is represented by the cross in the graph. FIG. 14c shows different focal length in relation to the thickness of source 18 and the divergence angle depicted in FIG. 14a. Each line having a different slope in the graph represents a different focal length. Six focal lengths are shown (from the top to the bottom): 3 mm, 4 mm, 5 mm, 7 mm, 10 mm and 15 mm. The preferred embodiment chosen and displayed in the figures is represented by a cross in the graphs.

Furthermore, box housing 24 preferably includes a wall 24a (shown in FIG. 12), which is fastened to chassis 30 and includes a convex shape facing the mounting basement 60. Said convex shape facilitates the active alignment of the various optical groups 5, 11 of module 3 as explained below.

In fact, said wall 24a allows box housing 24 supporting optics 11 to be rotated around a Cartesian axis (in this case the Z axis of the mounting plane (X,Z), before permanently fastening box housing 24 to chassis 30. Similarly, a wall convex in two directions, such as a section of a spherical surface (not shown in the figures), would lead to a rotation around any Cartesian axis.

Thanks to the configuration of optics 11 described above, beam of light T emitted from illumination device 6 is therefore a "sliver" of light having one dimension much greater than the other. In one direction in particular, the divergence is not relevant, while in the other it is less than or equal to 1.5° of half amplitude, making said line produced by non-coherent source 18 substantially comparable to the line produced by a laser source.

With reference to FIGS. 4 and 5, in the operation of linear reader 1 of the imager type, the beam of light emitted by source 18 is modified by optics 11 in order to generate a sliver T and field of view 15 of receiving device 2 must preferably overlap for the entirety or a majority of depth of field 15. Substantially, it is desired that the condition met for the entire depth of field of linear reader 1 is the one shown in FIG. 5, where depth of field 15 of receiving device 2 and line of light T generated by illumination device 6 (both shown in cross-section along a plane perpendicular to the direction of propagation of beam of light T) overlap, their dimensions being substantially similar starting at a certain distance from device 3.

However, this condition is not always implemented by means of passive alignment in the components of module 3.

Figure 6:
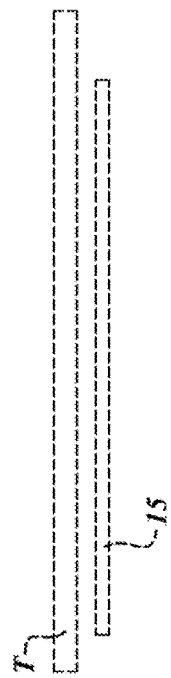
FIG. 6 is a schematic view of a first alignment error that can be resolved by means of the method of the invention.

Given the construction tolerances, the actual condition exhibits errors of 3 types:

Offset:

The line of light is not superimposed on that seen by the sensor. This condition is represented in FIG. 6. In this case linear sensor 4 does not "see" the image of optical code C illuminated by illumination line T because it does not shine in its working field 15. This is due to optical planes PI and PR not being parallel, as represented in FIG. 7.

It is required that in linear reader 1 the angle between optical plane AI of the illumination device and the optical plane AR of the receiving device be less than ±0.1°, while the mechanical tolerances without active alignment permit reaching a precision of about ±3.5°. This angle is defined around an axis substantially perpendicular to optical axes AI and AR.

Figure 7:
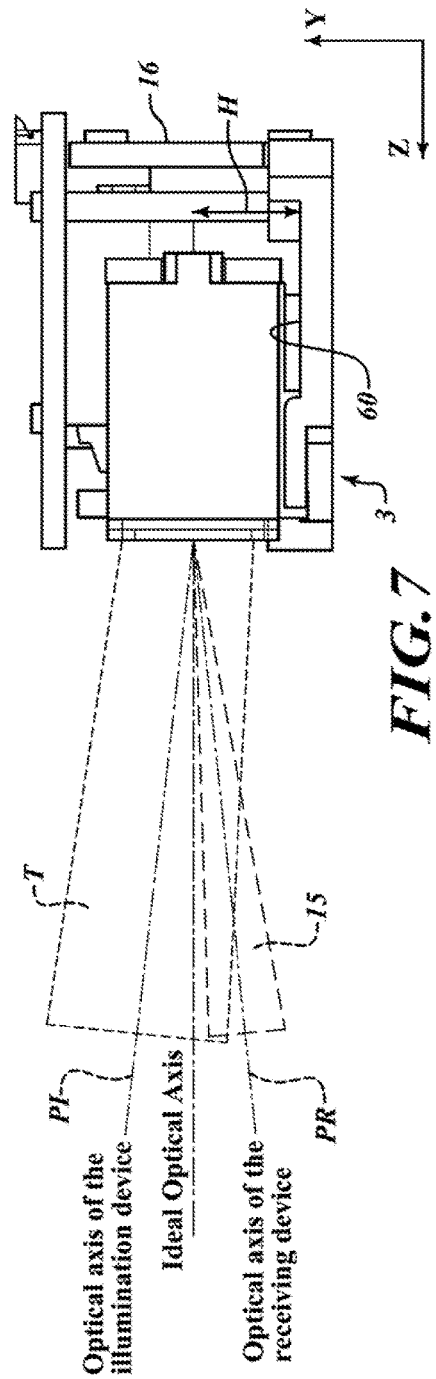
FIG. 7 is a view similar to FIG. 4 in order to show the cause of the error in FIG. 6.

FIG. 7 illustrates this angle of OFFSET error: the cross-section of planes PI and PR are shown, and the angle is the angle between the two planes rotated with respect to an axis substantially parallel to the mounting plane (X, Z), and in this case parallel to axis X.

Tilt:

Illumination line T is rotated with respect to field of view 15 of sensor 4 as seen in cross-section.

Figure 8:
FIG. 8 is a schematic view of a second alignment error that can be resolved by means of the method of the invention.
Figure 9:
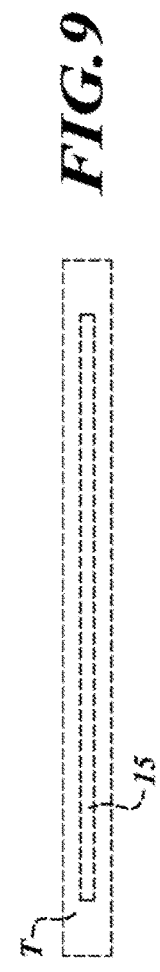
FIG. 9 is a schematic view of a third alignment error that can be resolved by means of the method of the invention.

It is created when illumination device 6 is rotated with respect to receiving device 2, that is to say optics 5 and 11 create lines 15 and T rotated with respect to each other, that is to say having their major dimensions not parallel to each other. This type of misalignment is represented in FIG. 8.

In other words, this error is created when plane PI and plane PR are rotated with respect to each other around an axis parallel to the optical axes of the two receiving and illumination devices. For example, in the depicted case this axis is parallel to the Z axis.

It is required that in linear reader 1 the angle between the two optical planes PI and PR is less than ±0.1°, while the mechanical tolerances without active alignment permit reaching a precision of about ±1.5°.

Defocus:

The line of light is thicker than desired and is not sharp. It is created when source 18 is placed at the wrong distance from collimator 22 or is rotated with respect to beam shaper 23, as shown schematically in FIG. 9.

It is required that the error in the position between source and collimator in linear reader 1 is less than ±10 μm (because of the short focal length), while the rotation between the major dimension and the axis of the beam shaper that forms the major dimension of collimated shaped beam T must be less than ±1°, which can be reached only with active alignment.

In order to obtain the required tolerances, a method of active alignment between receiving device 2 and illumination device 6 is applied according to the invention. The method described hereinafter is applicable not only to linear sensor 4 but also to other types of readers, including image sensors where a precise alignment between the various optical groups is required, and where the sensor may not be necessarily linear.

A first stage of the method of the invention includes assembling receiving device 2. This assembly preferably includes passively aligning optics 5 and placing it inside box housing 12. Then linear sensor 4 is fastened on PCB 16, which is in turn mounted orthogonally on chassis 30. Then an alignment is performed, preferably of the active type, between PCB-mounted sensor 4 and optics 5, which are inserted in receptacle 31 of chassis 30 and fastened thereto.

Preferably, this active alignment is carried out by inserting box housing 12 in receptacle 31 and moving box housing 12 back and forth in a translation movement until obtaining the desired alignment. Box housing 12 is then fastened in this position inside receptacle 31.

As was seen, ring 14 placed at one end of receptacle 31 prevents potential damage to sensor 4 by protecting it from dust or other things during the insertion into box housing 12.

In this manner, receiving device 2 is overall solidly attached to the mounting basement 60 of chassis 30.

Furthermore, an alignment is performed between optics 11 and source 18. First of all optics 11 are assembled in a box housing 24, in such a way that the various lenses, such as beam shaper 23 and collimator 22, are fastened inside box housing 24.

Then source 18 is mounted on PCB 17.

PCB 17, on which source 18 is soldered, is moved with respect to the two lenses collimator 22-beam shaper 23 of the illumination device, which are attached together in box housing 24. The movements are as follows:

translation parallel to mounting plane (X, Z), in particular along the Z axis,
translation perpendicular to the mounting plane along the Y axis,
rotation of the mounting plane (X, Z) around the Z axis.

This alignment is active.

In order to simplify this alignment, PCB 17 includes a plurality of indentations, which are all indicated with 17a, suitable for receiving a plurality of lobes 18a implemented in box housing 24. The dimension of lobes 18a is slightly less than that of the indentations, forming a gap between the lobes and the walls of the indentations, so as to allow the rotations around the Z axis, which are in any case limited by a minimum and a maximum determined by the movement room of lobes 18a inside respective indentations 17a.

Figure 10:
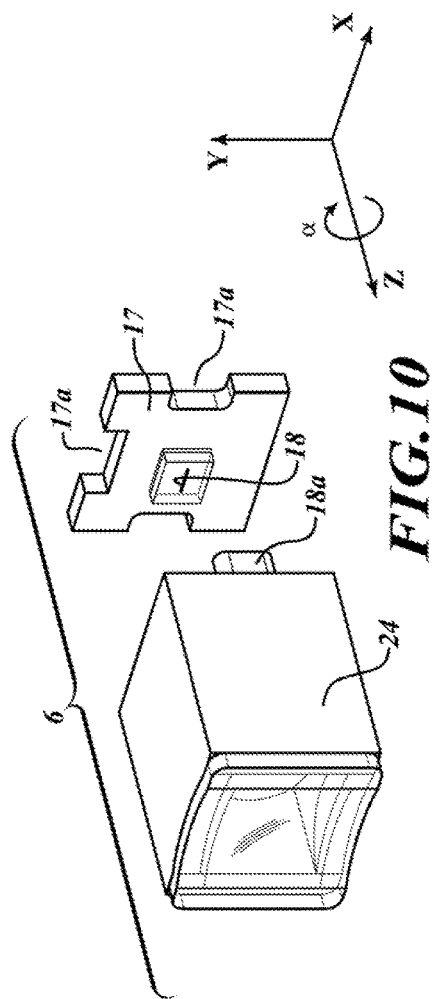
FIG. 10 is a perspective view of a stage in the method of the invention.

This stage is represented in FIG. 10 and mainly serves for correcting DEFOCUS and partially the OFFSET.

At the end of this stage PCB 17 is assembled together with optics 11, which is inserted in box housing 24: PCB 17 carrying source 18 is fastened at a far end of box housing 24. Source 18 and optics 11 form at this point a single body.

An active alignment stage of illumination system 6 with respect to receiving system 2 is foreseen at this point. This alignment is carried out by rotating illumination system 6, which at this point is a single body that includes optics group 11 and source 18, with respect to receiving system 2. Preferably, this alignment does not require translation movements, only rotations, as depicted in FIGS. 11 and 12.

Figure 11:
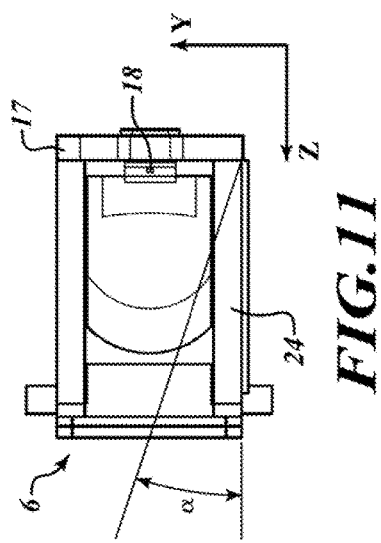
FIG. 11 represents a cross-section side view of an additional stage in the method of the invention.

FIG. 11 illustrates a rotation in the (Y, Z) plane by a given angle α around the X axis.

Figure 12:
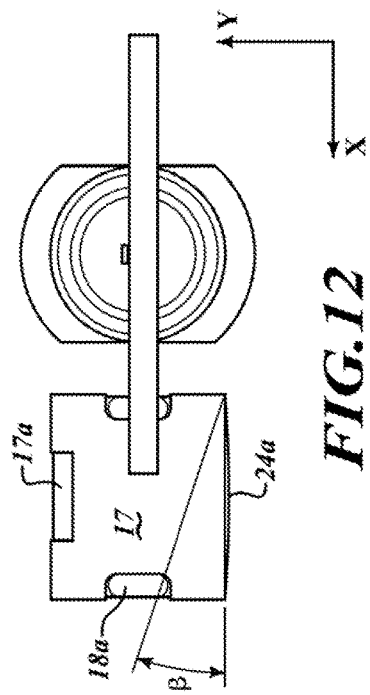
FIG. 12 represents an additional stage in the method according to the invention.

FIG. 12 illustrates a rotation by a given angle β around the Z axis.

Both rotations occur around axes that lie within or are parallel to the mounting plane (X, Z).

These two rotations permit an alignment between illumination device 6 and receiving device 2, so that the line or beam of light emitted by illumination device T is parallel to the major dimension of field of view 15, while the beam of light and field of view are substantially at the "same height" of the mounting plane (X, Z) so that they overlap for at least a certain range of distances from the illumination device. In particular, this step corrects the problems of the residual TILT and OFFSET intrinsic in the requirement for a thickness of the line comparable to the field of view of the receiving device.

The control of the angular position of illumination device 11 implemented by modifying the value of angles α and β is facilitated by the shape of wall 24a of box housing 24 containing optics 11 of the illumination device.

In particular, the bottom surface of said wall 24a that is mechanically interfaced to chassis 30 is not planar but curved in order to facilitate the rotations themselves.

FIGS. 18-21 depict in greater detail, albeit schematically, an image capture device module 3' according to a second embodiment of the present invention. Elements analogous to elements of the first embodiment of the module 3 are labelled with the same reference numeral. Only the differences between the module 3 and 3' will be highlighted in the following, being the other aspects and the functioning of the module 3' analogous to what it has been disclosed with reference to module 3.

As can be seen, receiving device 2' and illumination device 6' are both fastened on a chassis 30 of module 3', from which a system of coordinate axes is defined.

For example, metal constructed chassis 30 includes a basement 60 which defines a mounting plane (X, Z), called the horizontal plane, on which image formation device 3' is mounted, including receiving device 2' and illumination device 6', and a perpendicular axis Y, called the vertical axis.

Figure 21:
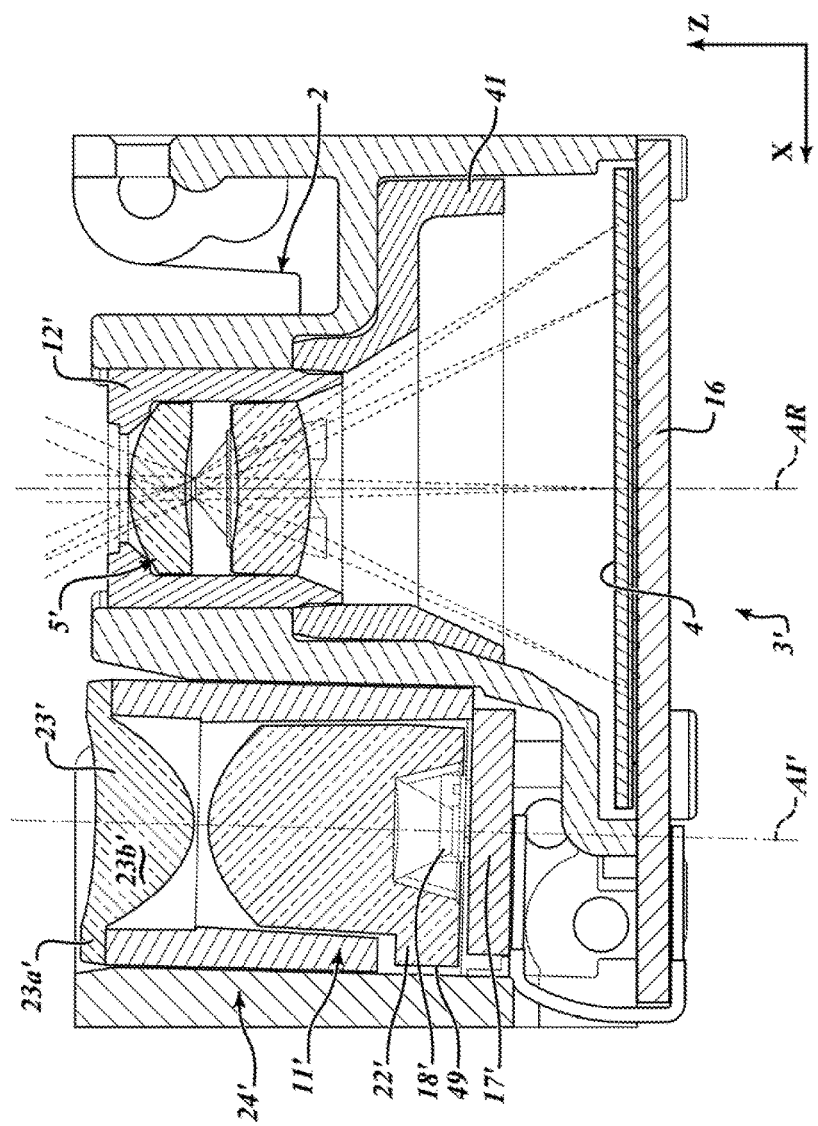
FIG. 21 is a cross-section view from the top of the component of the linear reader in FIGS. 18-20 during operation.
Figure 24:
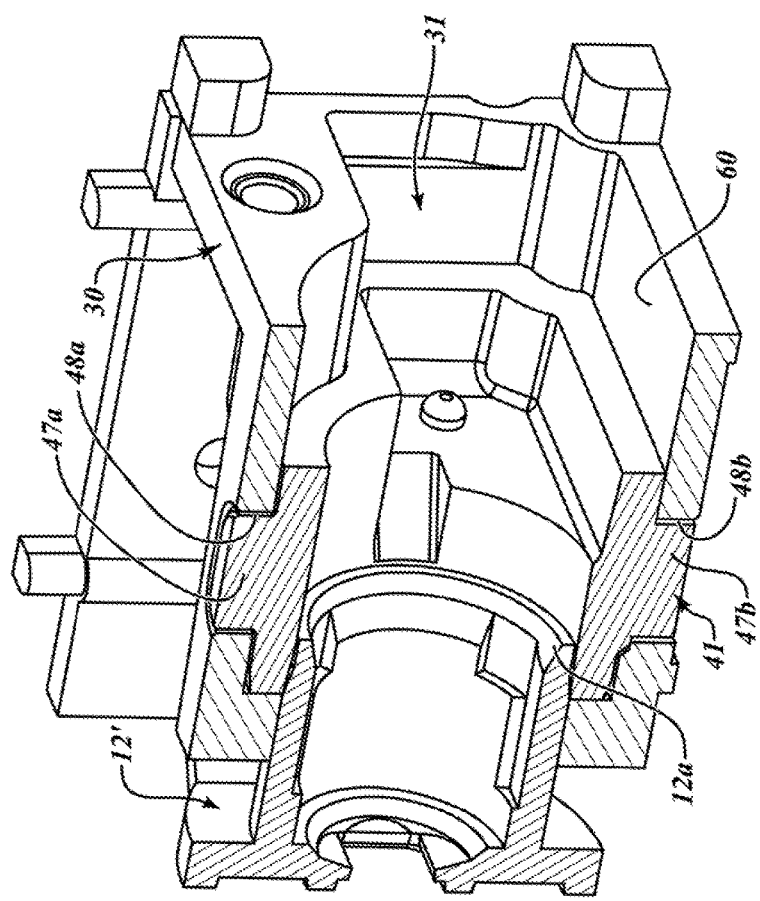
FIG. 24 is a perspective sectional view of a receiving device of the linear reader of FIGS. 18-21.

With now reference to FIG. 21, receiving device 2' includes linear sensor 4 (depicted in the cross-section in FIG. 2), which comprises, for example, an array of photosensitive elements, each one of which supplies an electric signal, the intensity of which is proportional to the incident light on it. Linear sensor 4 of receiving device 2' is identical to sensor 4 of module 3.

Preferably, linear sensor 4 is mounted on a printed circuit board, or PCB 16, which is in turn mounted on chassis 30, for example, perpendicularly to the plane (X, Z) in such a way that the main axis of orientation of linear sensor 4 is substantially parallel to plane (X, Z).

Receiving optics 5' are preferably assembled in a box housing 12', such as one constructed in metal. Box housing 12' preferably includes ribs 55 (one rib is partially visible in FIG. 20) to enter with interference inside the chassis, as detailed below. Chassis 30 preferably includes an integrated receptacle 31 implemented in one piece with chassis 30, in which box housing 12' is inserted. When inserted, one of the far ends 12a of box housing 12' faces PCB 16 and sensor 4.

Preferably, sensor 4 and receiving optics 5' are identical to those of module 3.

Receptacle 31 is hollow and preferably tubular shaped. Further, it is opened at both ends. In one end, the box housing 12' with the optics 5' is inserted, while at the opposite end the sensor 4 is placed, as detailed below.

In receptacle 31, a sleeve 41 is inserted, which covers most of the internal walls of the receptacle 31 itself.

Far end 12a is furthermore inserted into the sleeve 41 that functions as a gasket and is suitable for preventing the deposit of dust residue on the surface of sensor 4 during the insertion of box housing 12'. As mentioned, the ribs of the box housing 12' cause an interference with the sleeve 41 when the box housing is inserted into the sleeve 41. Said sleeve 41 is preferably made of rubber. Sleeve covers—at least for a portion—inner walls of receptacle 31 in order to form a darkroom for the sensor 4. Preferably the sleeve 41 is realized in a dark color, such as black, in order to form such a darkroom. Sleeve 41 also avoids—or minimizes— light reflection within the darkroom.

Further, receiving device 2' defines an optical receiving axis, receiving axis AR, shown in FIG. 21. Receiving axis AR is identified by the center of the elements of receiving optics 5', or by the centers of curvature of the optical surfaces in the case of a single lens. Preferably, as in the embodiment of module 3, receiving axis AR is orthogonal to sensor 4.

Sensor 4 is mounted on a PCB 16 which is mounted on chassis 30 substantially parallel to mounting plane (X, Z).

Preferably, as a result of the manner in which optical group 5' and sensor 4 on PCB 16 are mounted, said receiving axis AR is parallel to the mounting plane (X, Z).

Illumination device 6' comprises a source of light 18' suitable for emitting a beam of non-coherent light. In an embodiment, said source of light is a single source. Alternatively, the source of light comprises an array of sources arranged next to each other.

Preferably, said source includes a microLED and, more preferably, a microLED that emits radiation in the range of green or blue or red light, and, even more preferably, in the range of green light.

Source of light 18' is preferably rectangular and more preferably has the following dimensions:
Height of the source between 5 μm and 300 μm,
Width of the source between 100 μm and 3000 μm,
and wherein the ratio between height and width is preferably less than 1/5 (that is to say where height and width are preferably chosen within the given interval, but maintain in any event a ratio less than 1/5), and more preferably less than 1/10.

The used source 18' is a microLED having a width of 1000 μm and a height of 25 μm, thus with a ratio of 1/40.

Preferably, that source 18' is arranged so that its major dimension (the width) is positioned substantially parallel to mounting plane (X, Z). For example, source 18' is mounted on an additional PCB 17', which is in turn mounted on a box housing 24', in turn mounted on chassis 30. Preferably, PCB 16 and PCB 17' face each other and partially overlap but without touching and, more preferably, are parallel to each other. Furthermore, source 18' and sensor 4 may advantageously also turn out to be parallel to each other, having their respective major axis of orientation substantially parallel to each other.

Illumination device 6' further includes an illumination optics 11', suitable for modifying the beam emitted by source 18' and transforming it into a "line" of collimated light substantially divergent in a single direction, with the major axis of orientation parallel to the major direction in the cross-section of field of view 15 as shown in FIG. 16b.

Illumination optics 11' includes a collimator 22' and a beam shaper 23', arranged in this order along the direction of propagation of the beam of light emitted by source 18'. Preferably, the parameters of the collimator and beam shaper are chosen as described with reference to illumination optics 11'.

In this specific example of module 3',
Collimator:
    Width $L_1$=5 mm
    Height $H_1$=4 mm
    Depth: $D_1$=4.5 mm
    Focal length: f=3.3 mm.
    Back Focal Length (BFL—distance between the collimator and the microLed)=1.5 mm
Beam-Shaper:
    Width: $L_2$=5 mm
    Height $H_2$: in the example the total height is equal to 5.7 mm but the effective height is =4 mm
    Depth: $D_2$=2.3 mm The sum of the two thicknesses $D_1$ and $D_2$ must be less than the total depth of the module ($D_1+D_2 \leq 15$ mm).

Preferably, the beam shaper 23' has a positive focal length, e.g. it is a converging lens in the horizontal plane. After the first convergence, the beam diverges as required by the beam shaper construction. Therefore, the beam shaper 23' first converges and then diverges the light beam in the horizontal dimension.

This configuration has been chosen in order to minimize the negative effects of the Fresnel light reflections onto a glass window of the reader 1. It is known that the light emitted by the source 18' may be reflected on the glass window of the reader 1, on both its internal and external surfaces, regardless whether the glass has an anti-reflective coating or not (the intensity of reflected light is only reduced with the coating). The reflected light can be detected by sensor 4 if the light path has an angle such as to enter into the objective of the receiving device 2'. If the beam emitted by the source 18' impinges onto the glass window, reflections and multiple reflections are always present. However, for geometrical optical considerations, using a lens having a positive focal length as a beam shaper allows to have more freedom in positioning the glass window. Indeed, it is possible to position the glass window at a larger distance from the beam shaper 23' than in the case a lens having a negative focal length is used, considering the same amount of reflections collected by the sensor 4.

Preferably, collimator 22' and beam shaper 23' each include a single lens, so that illumination device 6' in turn includes only two lenses, as depicted in FIG. 21.

In order to limit the aberrations as much as possible, it is preferable that the surfaces of the lens comprising collimator 22' be aspherical and that the aperture of the lens be additionally less than the mechanical constraints.

As in the case of optics 5' of receiving device 2', optics 11' of illumination device 6' also define in the same manner an optical axis AI', which preferably goes through the geometric center of source 18'. In this embodiment, axes AI' and AH' are tilted one with respect to the other, preferably convergent. The preferred angle formed between the two axes is equal to about 1.5°.

Optics 11' comprising collimator 22' and beam shaper 23' are also preferably assembled in box housing 24', where PCB 17' including source 18' is fastened at the far end thereof. Box housing 24' is thus fastened to chassis 30 as described below.

Furthermore, box housing 24' is preferably parallelepiped-shaped and includes a first and second spherical caps 42a and 42b (shown in FIGS. 22a, 22b) located at opposite axial ends of the box housing, thus forming a first convex shape facing the mounting basement 60 and a second convex shape opposite to it. Said convex shapes facilitate the active alignment of the various optical groups 5', 11' of module 3' as explained below.

In fact, said caps 42a, 42b allow box housing 24' supported optics 11' to be rotated around a Cartesian axis (in this case the Z axis of the mounting plane (X,Z)), before permanently fastening box housing 24' to chassis 30.

Chassis 30 includes a concave seat 43, preferably a seat shaped as a portion of a sphere, realized onto basement 60. The seat 43 is apt to house one of the two caps 42a, 42b. Further, chassis 30 includes a cover 44 (visible in FIGS. 19 and 25) apt to be inserted in a plurality of tapered protrusions, for example in the depicted embodiment in the number of four all called 45, extending vertically, that is along the Y axis when the module 3' is mounted, from chassis 30. The protrusions 45 have the function of centering and fastening elements for the cover 44. The four tapered protrusions 45 project from the chassis 30. Cover 44 defines a further seat (not visible in the figures), also preferably shaped as a portion of a sphere, which is concave and faces the convex protrusion defined by the spherical cap 42a, 42b. Therefore, when the module 3' is mounted, the box housing 24' is sandwiched between the cover 44 and the basement 60 of the chassis 30: the basement and the cover exert a compression force onto the box housing 24' impeding movement of the latter in a mounted configuration. The further seat has for example a shape analogous to seat 43.

In a mounted configuration, that is when the cover 44 is inserted among protrusions 45, the latter are deformed so that the cover 44 is kept in place so that in turn the box housing 24' is fixed in a specific position.

Given the construction tolerances, the actual condition exhibits errors of three types, as already described with reference to module 3, that is of OFFSET, TILT and DEFOCUS.

In order to obtain the required tolerances, a method of mounting the module 3' applied according to the invention is used. The method described hereinafter is applicable not only to linear sensor 4 but also to other types of readers, including image sensors where a precise alignment between the various optical groups is required, and where the sensor may not be necessarily linear.

A first stage of the method of the invention includes assembling receiving device 2'. This assembly preferably includes passively aligning optics 5' and placing it inside box housing 12'. Then linear sensor 4 is fastened on PCB 16, which is in turn mounted orthogonally on chassis 30. The mounting of the PCB can also be performed at a later stage. Further, the sleeve 41 is inserted into receptacle 31 covering the lateral walls of the same. Then an alignment is performed, preferably of the active type, between PCB-mounted sensor 4 and optics 5', which are inserted in receptacle 31 of chassis 30 compressing the sleeve 41 and fastened thereto. The sleeve 41 remains fixed to receptacle 31 thanks to teeth or protrusion(s) 47a, 47b present in the sleeve, radially extending from the same, which can be compressed upon insertion of the sleeve into the receptacle 31 and impede further movements. For example, in the receptacle 31, slots 48a, 48b can be formed (see FIG. 24) at a given axial position along the Z axis; when the sleeve 41 starts its insertion in the receptacle 31, teeth 47a, 47b are radially compressed and the horizontal translation of the sleeve substantially along the Z axis into receptacle is possible, and when the axial position of the slots is reached, the teeth radially expand inside the slots so that they become inserted in the respective slots 48a, 48b formed in the receptacle. In this way, further movements, both translational and rotational, of the sleeve 41 are hindered.

Preferably, this active alignment is carried out by inserting box housing 12' in receptacle 31 and moving box housing 12' back and forth in a translation movement until obtaining the desired alignment. Box housing 12' is then fastened in this position inside receptacle 31.

As was seen, sleeve 41 prevents potential damage to sensor 4 by protecting it from dust or other things during the insertion of the box housing 12'.

In this manner, receiving device 2' is overall solidly attached to chassis 30. This configuration is the one depicted in FIG. 24, where the receiving device 2' is depicted assembled and sectioned, and in FIG. 20 where the chassis with the assembled and fixed receiving device 2' is shown.

Furthermore, an alignment is performed between optics 11' and source 18'. First of all optics 11' is assembled in box housing 24', in such a way that the various lenses, such as beam shaper 23' and collimator 22', are placed inside box housing 24'.

With reference to FIGS. 22a, 22b and 23, the box housing 24' is shown. The beam shaper 23' has on one end a flange 23a' which protrudes radially from a central element 23b'. The beam shaper is preferably first firmly fastened to the box housing. For example, a manipulator can handle the beam shaper 23', insert it into the box housing 24' through one end of the box housing and press it till the flange 23a' abuts to the end of the box housing 24'. While keeping the flange pressed against the box housing, glue is preferably applied at a boundary line between the flange 23a' and the box housing 24'. Pressure is kept to avoid that glue may leak inside the box housing and stain the optics 11'.

The collimator 22' is preferably integral to a rod (not visible in the figures) that is used during the mounting. The collimator 22' is inserted inside the box housing 24' completely through the end of the box housing opposite the beam shaper 23', however the collimator 22' can be translated by means of the rod which can protrude from housing by means of an elongate through hole 49 realized in the lateral wall of the box housing 24'.

At this point, the collimator 22' is not yet fixed to the box housing 24', but it can still be adjusted by means of the rod.

Then source 18' is mounted on PCB 17'.

PCB 17', on which source 18' is advantageously soldered, is moved with respect to the two lenses collimator 22'-beam shaper 23' of the illumination device 6', which are attached together in box housing 24'. The movements are as follows:

translation perpendicular to the mounting plane along the Y axis, rotation around the Z axis.

Optionally, also a translation along the X axis is also performed,

This alignment is active.

In order to simplify this alignment, PCB 17' includes a plurality of lobes, which are all indicated with 50, between which a suitable tool can be inserted in order to grip, rotate and translate the PCB 17'.

The position of the collimator 22' inside the box housing 24' and the position of the PCB 17' to which the source 18', e.g. the microLED, is attached is selected as the position in which the line of light projected by the microLED at a given distance, preferably the reference distance of 500 mm, is in focus and has the desired shape and dimension. When this configuration is achieved, the collimator 22' and the PCB 17' are fastened to the box housing 24' by means preferably of glue. The rod protruding from the collimator is also removed (e.g. broken). The illumination system 6' of FIG. 23 is thus obtained.

Source 18' and optics 11' form at this point a single body.

An active alignment stage of illumination system 6' with respect to receiving system 2' is foreseen at this point. This alignment is carried out by rotating illumination system 6', which at this point is a single body that includes optical group 11' and source 18', with respect to receiving system 2'.

The illumination system 6' is then placed onto the mounting basement 60 with the spherical cap 42b inserted in the spherical seat 43. The illumination device is still movable and can rotate around the X axis and around the Z axis, in other words can perform "clockwise and counter-clockwise" rotations and/or "up-down" rotations.

Preferably, the surface of the cap 42b which is in contact with the chassis 30 in seat 43 is rough, i.e. not smooth, as well as the surface of the seat 43 itself. In this way a friction force is present every time the illumination device 6' rotates.

PCB 16 on which the sensor 4 is mounted is now attached to chassis 30, for example by means of centering means (not visible) and screws. Current to power PCBs 17' and 16 is preferably brought by means of electrical connectors 51 (see FIG. 25).

Cover 44 is then positioned on top of the illumination device 6' between the protrusions 45. The cover 44 and its spherical further seat are also realized such that the surface of cover 44 in contact with spherical cap 42a is substantially rough.

These two allowed rotations of the illumination device 6', which are obtained by means of a tool having grips which can be introduced through holes 46a and 46b realized in cap 42a and in basement 60 at the seat 43, respectively, in order to hold and rotate the illumination device 6', permit an alignment between illumination device 6' and receiving device 2', so that the line or beam of light emitted by illumination device T is parallel to the major dimension of field of view 15, while the beam of light and field of view are substantially at the "same height" from the mounting plane (X, Z) so that they overlap for at least a certain range of distances from the illumination device.

These rotations facilitated by the shape of the seat 43, further seat, and caps 42a, 42b allow a relatively simple alignment between the two devices. As soon as the two lines overlap, which is detected by a suitable detector device, not depicted in the drawing, the rotation of the illumination device stops and the device 6' is blocked in the specific reached position. The fastening take place deforming tapered protrusions 45 so that the cover 44 cannot move from the reached position. This means that the two substantially parallel plates, the basement 60 and the cover 44, compress the box housing 24' of the illumination device 6' from opposite sides. This compression and the strong friction force which is generated when the surfaces of the caps 42a, 42b slide on the surfaces of the seat 43, and further seat, due to their rough structure, minimize the risk of further movements of the illumination device 6'.

By fastening the illumination device 6' to the chassis 30, the configuration of FIG. 19 is reached.

A further PCB 52 is coupled to the chassis 30, substantially parallel to the mounting plane (X, Z), electrically connected to the other two PCBs 17' and 16. This configuration is depicted in FIG. 18.

The invention claimed is:

1. An active alignment method of a receiving device including a sensor and an illumination device including at least one light source suitable for emitting a beam of light, including:
    assembling said receiving device;
    stably fixing said receiving device on a chassis;
    actively aligning an optical group of said illumination device with respect to said light source;
    fixedly connecting said optical group of said illumination device to said light source;
    actively aligning said illumination device with respect to said receiving device; and
    stably fixing said illumination device to said chassis.

2. The method according to claim 1, wherein assembling said receiving device and stably fixing said receiving device on a chassis include:
    mounting said sensor on a printed circuit;
    fixing said printed circuit to said chassis;
    mounting an optical group of said receiving device in a box housing; and
    fixing said box housing to said chassis.

3. The method according to claim 2, wherein fixing said box housing to said chassis includes:
    actively aligning said box housing with said sensor by moving said box housing along a translation direction.

4. The method according to claim 1, wherein mounting an optical group of said receiving device in a box housing and fixing said box housing to said chassis include:
    inserting said box housing in a receptacle made integral with said chassis.

5. The method according to claim 1, wherein actively aligning said optical group of said illumination device with respect to said light source includes:
    assembling said optical group of said illumination device in a box housing;
    mounting said light source in a printed circuit; and
    translating or rotating said printed circuit with respect to said box housing so as to actively align said optical group of said illumination device with respect to said light source.

6. The method according to claim 1, wherein said optical group includes a collimator and a beam shaper and wherein actively aligning said optical group of said illumination device with respect to said light source includes:
    mounting and fixing said beam shaper in a box housing;
    inserting said collimator inside said box housing;
    mounting said light source in a printed circuit; and
    translating or rotating said printed circuit with respect to said box housing and translating or rotating said collimator so as to actively align said optical group of said illumination device with respect to said light source.

7. The method according to claim 1, wherein actively aligning said illumination device with respect to said receiving device includes:
    rotating said optical group of said illumination device as a unit with said light source with respect to said receiving device.

8. The method according to claim 7, wherein rotating said optical group of said illumination device includes:
    rotating said optical group of said illumination device about a first axis belonging to a mounting plane of said chassis; or
    rotating said optical group of said illumination device about a second axis belonging to a mounting plane of said chassis substantially perpendicular to said first axis.

9. A linear reader of optical information of the imager type, said reader including:
- a receiving device including a linear sensor and an optical group defining an optical receiving axis and a field of view, said field of view having, in section, a major dimension and a minor dimension;
- an illumination device including at least one non-coherent light source, and an optical group defining an optical illumination axis and suitable for emitting a beam of light;

wherein
- said optical receiving axis and said optical illumination axis are substantially coplanar;
- said optical group of said illumination device comprises, arranged in sequence downstream of said light source in the direction of propagation of said beam of light:
  - a collimator suitable for emitting in output a beam of collimated light the cross-section of which in a plane substantially perpendicular to a direction of propagation has a major dimension and a minor dimension, and with a divergence in the minor dimension of less than 1.5° of half-amplitude; and
  - a beam shaper suitable for emitting in output a shaped collimated beam the cross-section of which in a plane substantially perpendicular to a direction of propagation has a major dimension and a minor dimension and suitable for making said major dimension substantially parallel to said major dimension of said field of view.

10. The reader according to claim 9, wherein said beam shaper is suitable for emitting in output a beam of shaped collimated light with substantially uniform power along said major direction of said shaped collimated beam.

11. The reader according to claim 9, wherein said beam shaper is invariant in a direction perpendicular to said major dimension of said beam of shaped collimated light, so as not to modify said beam of collimated light in said direction.

12. The reader according to claim 11, wherein said perpendicular direction in which said beam shaper is invariant corresponds to the minor dimension of said beam of collimated light in output from said collimator.

13. The reader according to claim 9, wherein said non-coherent light source extends along a main direction, said main direction being substantially parallel to said major dimension of said shaped collimated beam.

14. The reader according to claim 9, wherein said light source includes a microLED.

15. The reader according to claim 14, wherein said light source includes a single microLED.

16. The reader according to claim 14, wherein said light source includes a linear array of microLEDs.

17. The reader according to claim 9, wherein said light source has a dimension comprised between 5 μm and 300 μm in a first direction.

18. The reader according to claim 9, wherein said light source has a dimension comprised between 100 μm and 3000 μm in a second direction.

19. The reader according to claim 17, wherein said light source has a dimension comprised between 100 μm and 3000 μm in a second direction, and a ratio between said dimension in said first direction and said dimension in said second direction of said non-coherent light source is less than 1/5.

20. The reader according to claim 9, wherein a focal length of said collimator comprised between 1 mm and 6 mm.

21. The reader according to claim 17, wherein a focal length of said collimator is equal to:

focal length=(dimension of source in said first direction*distance)/(minor dimension of said collimated beam cross section), where said minor dimension of said collimated beam cross section is less than or equal to 15 mm, and distance equals 500 mm.

22. The reader according to claim 9, wherein a distance between said collimator and said light source in a direction of propagation of said beam of light is less than 15 mm.

23. The reader according to claim 9, wherein said collimator includes a single lens and said beam shaper includes a single lens.

24. The reader according to claim 9, wherein the sum of a maximum thickness of said collimator and of a maximum thickness of said beam shaper in a direction of propagation of said beam of light is less than 15 mm.

25. The reader according to claim 9, wherein said optical receiving axis and said optical illumination axis are convergent.

26. The reader according to claim 9, wherein said collimator is suitable for emitting in output a beam of collimated light having a divergence in the minor dimension of less than 1° of half-amplitude.

27. The reader according to claim 9, wherein said field of view is less than 0.5° of half-amplitude along said minor dimension of said field of view.

28. The reader according to claim 9, including a chassis, said receiving device and said illumination device being mounted adjacent on said chassis on a mounting basement defining a mounting plane, wherein said linear sensor and said light source are arranged substantially perpendicular to said mounting plane, wherein said linear sensor is fixed onto a printed circuit mounted on said basement, said linear sensor having a longer direction of extension substantially parallel to said mounting plane, and wherein said receiving device and said illumination device are mounted on said chassis so that a plane defined by said optical receiving axis and said optical illumination axis is parallel to said mounting plane.

29. The reader according to claim 28, wherein said illumination device includes a box housing including said collimator and said beam shaper, said box housing comprising, or suitable for being associated with, means for adjusting at least one rotation angle about an axis of said box housing.

30. The reader according to claim 29, wherein said box housing includes a mounting wall in contact with said mounting basement, said mounting wall having a geometric configuration such as to allow a rotation of said box housing around at least one Cartesian axis.

31. The reader according to claim 30, wherein said chassis includes a seat having a shape suitable for having a shape coupling with said geometric configuration of said mounting wall of said box housing.

32. The reader according to claim 29, wherein said box housing includes at least one mounting wall with which said box housing is in contact to said mounting basement, said mounting wall having a convexity facing towards said mounting basement of said chassis.

33. The reader according to claim 29, wherein said box housing includes two spherical caps mating two corresponding concave seats in said chassis.

34. The reader according to claim 28, wherein said chassis includes an integrated receptacle for housing said optical group of said receiving device.

35. The reader according to claim 34, wherein said receptacle comprises a ring or a sleeve made from resilient material in contact with a distal end of said optical group, said ring or sleeve facing said linear sensor.

36. A linear reader of optical information of the imager type, said linear reader including:
- a receiving device including a linear sensor and an optical group defining an optical receiving axis and a field of view, said field of view having, in section, a major dimension and a minor dimension; and
- an illumination device including at least one non-coherent light source and an optical group defining an optical illumination axis and suitable for emitting a beam of light;

wherein
- said optical receiving axis and said optical illumination axis are substantially coplanar;
- said optical group of said illumination device comprises, arranged in sequence downstream of said light source in the direction of propagation of said beam of light:
- a collimator suitable for emitting in output a beam of collimated light the section of which in a plane substantially perpendicular to the direction of propagation has a major dimension and a minor dimension, and
- a beam shaper suitable for emitting in output a shaped collimated beam the section of which in a plane substantially perpendicular to the direction of propagation has a major dimension and a minor dimension, and suitable for making said major dimension substantially parallel to said major dimension of said field of view, so as to make a beam of shaped collimated light having said minor dimension of a size less than 15 mm at a distance equal to 500 mm from an outlet of said illumination device.

* * * * *